(12) United States Patent
Byrd, Jr. et al.

(10) Patent No.: US 9,339,058 B2
(45) Date of Patent: May 17, 2016

(54) METHOD FOR PRODUCING MICROCRYSTALLINE CELLULOSE FROM TOBACCO AND RELATED TOBACCO PRODUCT

(75) Inventors: Medwick Vaughan Byrd, Jr., Raleigh, NC (US); Paul Stuart Chapman, Winston Salem, NC (US); Samuel Mark Debusk, Lexington, NC (US); Grady Lance Dooly, Winston-Salem, NC (US); Anthony Richard Gerardi, Winston-Salem, NC (US); David Neil McClanahan, Winston-Salem, NC (US)

(73) Assignee: R. J. Reynolds Tobacco Company, Winston-Salem, NC (US)

(*) Notice: Subject to any disclaimer, the term of this patent is extended or adjusted under 35 U.S.C. 154(b) by 1064 days.

(21) Appl. No.: 13/451,032

(22) Filed: Apr. 19, 2012

(65) Prior Publication Data

US 2013/0276801 A1 Oct. 24, 2013

(51) Int. Cl.
*A24B 13/00* (2006.01)
*A24B 15/12* (2006.01)
*A24B 15/28* (2006.01)
*C08L 1/00* (2006.01)
(Continued)

(52) U.S. Cl.
CPC *A24B 15/12* (2013.01); *C08H 8/00* (2013.01); *C08L 1/04* (2013.01); *C08L 97/02* (2013.01); *C09J 101/04* (2013.01)

(58) Field of Classification Search
USPC .......................... 131/290, 297, 309, 352, 356
See application file for complete search history.

(56) References Cited

U.S. PATENT DOCUMENTS 2,978,446 A  4/1961 Battista et al.
3,889,689 A  6/1975 Rosen 4,196,739 A * 4/1980 Buisson .................. A24B 15/12
131/353
(Continued)

FOREIGN PATENT DOCUMENTS

CN  1152038  6/1997

OTHER PUBLICATIONS

Machine translation of CN 1152038, European Patent Office and Google, [online], 2015, retrieved from the Internet, retrieved Sep. 5, 2015, <URL:http://translationportal.epo.org/emtp/translate/?ACTION=descriptionretrieval&COUNTRY=CN&ENGINE=google&FORMAT=docdb&KIND=A&LOCALE=en_EP&NUMBER=1152038&OPS=cn.espacenet.com/ops&SRCLANG=zh&TRGLANG=en.*
(Continued)

*Primary Examiner* — Dennis Cordray
(74) *Attorney, Agent, or Firm* — Womble Carlyle Sandridge & Rice LLP

(57) ABSTRACT

Methods for producing dissolving grade pulp and microcrystalline cellulose from tobacco are provided. The methods include chemical pulping a tobacco input to form a tobacco pulp. Chemical pulping the tobacco input includes combining the tobacco input with a strong base defining a weight from about 5% to about 50% of the tobacco input, and heating the tobacco input and the strong base with an H-factor from about 500 to about 3,300. Further, the methods include bleaching the tobacco pulp to produce a dissolving grade pulp. Bleaching the tobacco pulp may include chlorination of the tobacco pulp with a chlorine dioxide solution, and caustic extraction of the tobacco pulp with a second strong base. A related tobacco-derived microcrystalline cellulose product is also provided, which can be used as a binder, a filler, and/or a texturizer in a tobacco product, such as a smokeless tobacco product.

30 Claims, 2 Drawing Sheets

(51) Int. Cl.
C08L 97/02 (2006.01)
C08H 8/00 (2010.01)
C08L 1/04 (2006.01)
C09J 101/04 (2006.01)

(56) References Cited

U.S. PATENT DOCUMENTS

| | | | |
|---|---|---|---|
| 4,270,552 A | 6/1981 | Jenkins et al. | |
| 4,641,667 A | 2/1987 | Schmekel et al. | |
| 5,145,557 A | 9/1992 | Peter et al. | |
| 5,533,530 A | 7/1996 | Young et al. | |
| 5,589,033 A | 12/1996 | Tikka et al. | |
| 6,159,336 A * | 12/2000 | Engstrom | D21C 1/00 162/17 |
| 6,273,994 B1 * | 8/2001 | Creber | D21C 5/005 162/238 |
| 7,005,514 B2 | 2/2006 | Nguyen | |
| 7,048,211 B2 | 5/2006 | Bratcher et al. | |
| 8,434,496 B2 * | 5/2013 | Chen | A24B 15/306 131/290 |
| 2008/0308115 A1 | 12/2008 | Zimmermann | |
| 2011/0174323 A1 | 7/2011 | Coleman, III et al. | |
| 2011/0259353 A1 | 10/2011 | Coleman, III et al. | |

OTHER PUBLICATIONS

S. Agrupis, et al. *Industrial Utilization of Tobacco Stalks (I) Preliminary Evaluation for Biomass Resources*; Holzforschung; 1999; pp. 29-32; vol. 53, No. 1.

J. Behin, et al.; *Dissolving Pulp (alpha-cellulose) from Corn Stalk by Kraft Process*; Iranian Journal of Chemical Engineering; 2008; pp. 14-28; vol. 5, No. 3.

M. J. Kocurek; et al; *Secondary Fibers and Non-Wood Pulping*; Pulp and Paper Manufacture $3^{rd}$ Ed.; pp. 30-39, 48-51, 58-60, 78-80, 84-91, 102-104, 108-109, 110-121, 179-188 and 234-237; vol. 3.

International Search Report and Written Opinion of the International Searching Authority for corresponding International Application No. PCT/US2013/037305 mailed Sep. 20, 2013.

* cited by examiner

METHOD FOR PRODUCING MICROCRYSTALLINE CELLULOSE FROM TOBACCO AND RELATED TOBACCO PRODUCT

FIELD OF THE DISCLOSURE

The present disclosure relates to products made or derived from tobacco, or that otherwise incorporate tobacco, and are intended for human consumption and methods for the production thereof. The tobacco-derived products can be employed in a smokeless form in some embodiments.

BACKGROUND OF THE DISCLOSURE

Cigarettes, cigars, and pipes are popular smoking articles that employ tobacco in various forms. Such smoking articles are employed by heating or burning tobacco to generate aerosol (e.g., smoke) that can be inhaled by the smoker. Tobacco can also be enjoyed in a so-called "smokeless" form. Particularly popular smokeless tobacco products are employed by inserting some form of processed tobacco or tobacco-containing formulation into the mouth of the user. See, for example, the types of smokeless tobacco formulations, ingredients, and processing methodologies set forth in U.S. Pat. No. 1,376,586 to Schwartz; U.S. Pat. No. 3,696,917 to Levi; U.S. Pat. No. 4,513,756 to Pittman et al.; 4,528,993 to Sensabaugh, Jr. et al.; U.S. Pat. No. 4,624,269 to Story et al.; U.S. Pat. No. 4,991,599 to Tibbetts; U.S. Pat. No. 4,987,907 to Townsend; U.S. Pat. No. 5,092,352 to Sprinkle, III et al.; U.S. Pat. No. 5,387,416 to White et al.; U.S. Pat. No. 6,668,839 to Williams; U.S. Pat. No. 6,834,654 to Williams; U.S. Pat. No. 6,953,040 to Atchley et al.; U.S. Pat. No. 7,032,601 to Atchley et al.; U.S. Pat. No. 7,694,686 to Atchley et al.; U.S. Pat. No. 7,810,507 to Dube et al.; U.S. Pat. No. 7,819,124 to Strickland et al.; U.S. Pat. No. 7,861,728 to Holton, Jr. et al.; and U.S. Pat. No. 7,901,512 to Quinter et al.; US Pat. Pub. Nos. 2004/0020503 to Williams; 2005/0244521 to Strickland et al.; 2006/0191548 to Strickland et al.; 2007/0062549 to Holton, Jr. et al.; 2008/0029116 to Robinson et al.; 2008/0029117 to Mua et al.; 2008/0173317 to Robinson et al.; 2008/0196730 to Engstrom et al.; 2008/0209586 to Neilsen et al.; 2008/0305216 to Crawford et al.; 2009/0065013 to Essen et al.; 2009/0293889 to Kumar et al.; 2010/0291245 to Gao et al.; and 2011/0139164 to Mua et al.; PCT WO 04/095959 to Arnarp et al.; and WO 2010/132444 A2 to Atchley; each of which is incorporated herein by reference. Exemplary smokeless tobacco products that have been marketed include those referred to as CAMEL Snus, CAMEL Orbs, CAMEL Strips and CAMEL Sticks by R. J. Reynolds Tobacco Company; GRIZZLY moist tobacco, KODIAK moist tobacco, LEVI GARRETT loose tobacco and TAYLOR'S PRIDE loose tobacco by American Snuff Company, LLC; KAYAK moist snuff and CHATTANOOGA CHEW chewing tobacco by Swisher International, Inc.; REDMAN chewing tobacco by Pinkerton Tobacco Co. LP; COPENHAGEN moist tobacco, COPENHAGEN Pouches, SKOAL Bandits, SKOAL Pouches, RED SEAL long cut and REVEL Mint Tobacco Packs by U.S. Smokeless Tobacco Company; and MARLBORO Snus and Taboka by Philip Morris USA.

It would be desirable to provide an enjoyable form of a tobacco product, such as a smokeless tobacco product, that could be produced entirely or substantially entirely from tobacco.

SUMMARY OF THE DISCLOSURE

In one embodiment a tobacco product is provided. The tobacco product can comprise a tobacco material and a microcrystalline cellulose (MCC) product derived from a tobacco input. In some embodiments the tobacco input can be subjected to a plurality of operations, including chemical pulping the tobacco input to form a tobacco pulp. Chemical pulping the tobacco input can comprise combining the tobacco input with a strong base (e.g., sodium hydroxide), and heating the tobacco input and the strong base. The tobacco input can also be subjected to bleaching the tobacco pulp to produce a dissolving grade pulp. By way of example, bleaching the tobacco pulp can comprise chlorination of the tobacco pulp with a chlorine dioxide solution, and caustic extraction of the tobacco pulp with a second strong base (e.g., sodium hydroxide).

In some embodiments of the chemical pulping process, the strong base can be present in an amount from about 5% to about 50% by weight of the tobacco input. Heating the tobacco input and the strong base can be conducted with an H-factor from about 500 to about 3,300. The tobacco pulp (e.g., after chemical pulping) can define a kappa number of less than about 23. The dissolving grade pulp (e.g., after bleaching) can be characterized by a brightness of at least about 83%, a content of alpha-cellulose of at least about 88% by weight, a degree of polymerization of less than about 750, and/or a viscosity between about 2 centipoise and about 15 centipoise in a solution of 0.5% cupriethylenediamine by weight. The microcrystalline cellulose product can be utilized as a binder, a filler, dispersant, flavor carrier, humectant and/or a texturizer in a tobacco product, such as a smokeless tobacco product.

In an additional embodiment, a method for processing tobacco is provided. The method can comprise chemical pulping a tobacco input to form a tobacco pulp. Chemical pulping the tobacco input can comprise combining the tobacco input with a strong base (e.g., sodium hydroxide) having a weight from about 5% to about 50% of the tobacco input, and heating the tobacco input and the strong base with an H-factor from about 500 to about 3,300. Further, the method can include bleaching the tobacco pulp to produce a dissolving grade pulp. By way of example, bleaching the tobacco pulp can comprise chlorination of the tobacco pulp with a chlorine dioxide solution, and caustic extraction of the tobacco pulp with a second strong base, such as sodium hydroxide.

In some embodiments the tobacco pulp can comprise tobacco stalk and/or reconstituted tobacco. The method can further comprise drying the tobacco input prior to chemical pulping the tobacco input. Additionally, the method can include depithing the tobacco input prior to chemical pulping the tobacco input. Further, the method can include milling the tobacco input prior to chemical pulping the tobacco input. Also, the method can further comprise mixing water with the tobacco pulp to form a slurry, and filtering the slurry with a filter such that a portion of the tobacco pulp is removed. The filter can define a plurality of apertures having, for example, a maximum dimension up to about 0.01 inches. Filtering the slurry can comprise receiving a first portion of the tobacco pulp through the filter and receiving a second portion of the tobacco pulp through the filter after receiving the first portion, wherein at least the second portion of the tobacco pulp is subjected to the bleaching.

In some embodiments the strong base employed in chemical pulping the tobacco input can be present in an amount of about 30% to about 40% by weight of the tobacco input. The H-factor can be from about 900 to about 1,100. The method can further comprise removing at least a portion of the water from the tobacco pulp received through the filter prior to the bleaching. The portion of the tobacco pulp that is removed can define a weight that is greater than about 25% of the tobacco pulp weight prior to filtering.

In some embodiments the strong base employed in chemical pulping the tobacco input can define a weight that is less than about 30% of the tobacco input and/or the H-factor can be less than about 1,000. In another embodiment the strong base employed in chemical pulping the tobacco input defines a weight that is greater than about 40% of the tobacco input and/or the H-factor can be greater than about 900. Further, chlorination of the tobacco pulp with a chlorine dioxide solution can comprise in situ acidification of sodium chlorite.

In some embodiments the method can further comprise neutralizing a remaining portion of the chlorine dioxide solution with sodium sulfite. The method can also include agitating the tobacco pulp during the chlorination of the tobacco pulp with the chlorine dioxide solution. The method can further comprise boiling the dissolving grade pulp in the presence of hydrochloric acid to produce a boiled dissolving grade pulp. Additionally, the method can include filtering a microcrystalline cellulose residue from the boiled dissolving grade pulp. Also, the method can include drying and milling the microcrystalline residue to produce a microcrystalline powder.

In some embodiments bleaching the tobacco pulp to produce the dissolving grade pulp can be conducted in an ordered sequence comprising chlorination of the tobacco pulp with the chlorine dioxide solution, caustic extraction of the tobacco pulp with the second strong base, and chlorination of the tobacco pulp with a second chlorine dioxide solution. In another embodiment bleaching the tobacco pulp to produce the dissolving grade pulp can be conducted in an ordered sequence comprising chlorination of the tobacco pulp with the chlorine dioxide solution, caustic extraction of the tobacco pulp with the second strong base, chlorination of the tobacco pulp with a second chlorine dioxide solution, and chlorination of the tobacco pulp with a third chlorine dioxide solution.

In some embodiments, chemical pulping the tobacco input further comprises combining the tobacco input with anthraquinone defining a weight from about 0.05% to about 0.4% of the tobacco input. The tobacco input and the strong base can be heated to a maximum temperature from about 150° C. to about 180° C. Further, chemical pulping the tobacco input can be conducted in a pressurized vessel. The method can also include agitating the tobacco input in the vessel. Additionally, the chlorine dioxide solution can comprise sulfuric acid.

In another embodiment a dissolving grade pulp derived from tobacco is provided. The dissolving grade pulp may be characterized by a brightness of at least about 83% and an alpha-cellulose concentration of at least about 88% by weight. The dissolving grade pulp may be formed by subjecting a tobacco input to the following operations: chemical pulping the tobacco input to form a tobacco pulp, and bleaching the tobacco pulp. Chemical pulping the tobacco input may comprise combining the tobacco input with a strong base, and heating the tobacco input and the strong base. Bleaching the tobacco pulp may comprise chlorination of the tobacco pulp with a chlorine dioxide solution, and caustic extraction of the tobacco pulp with a second strong base.

Other aspects and advantages of the present invention will become apparent from the following.

BRIEF DESCRIPTION OF THE DRAWINGS

In order to assist the understanding of embodiments of the disclosure, reference will now be made to the appended drawings, which are not necessarily drawn to scale. The drawings are exemplary only, and should not be construed as limiting the disclosure.

DETAILED DESCRIPTION OF THE PREFERRED EMBODIMENTS

Figure 1:
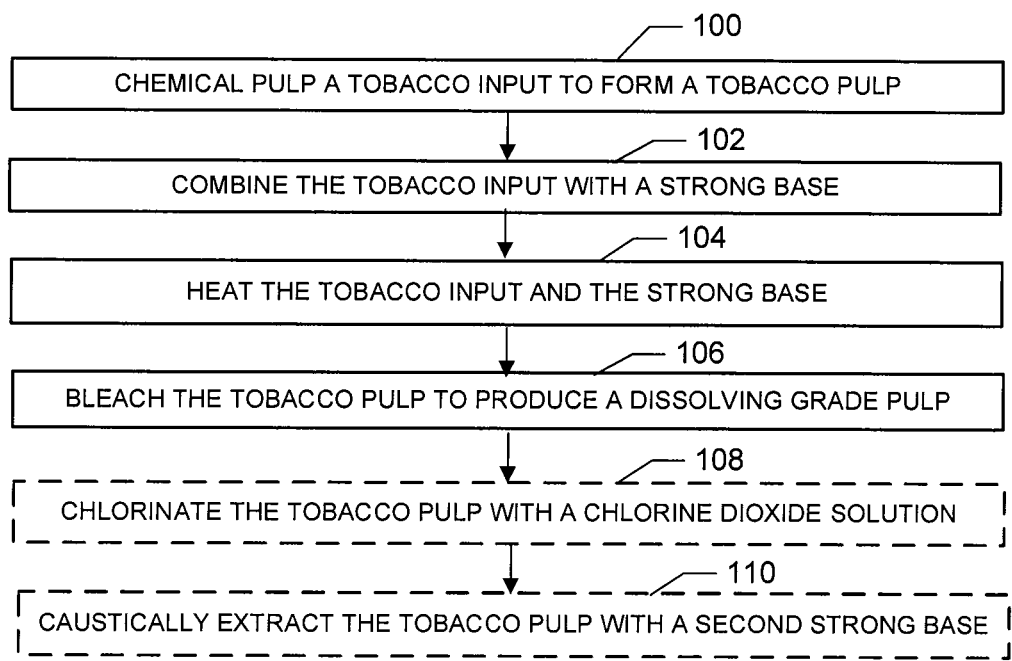
FIG. 1 is a block diagram of a method for producing a dissolving grade pulp from tobacco according to an example embodiment.

The present disclosure now will be described more fully hereinafter with reference to the accompanying drawings. The disclosure can be embodied in many different forms and should not be construed as limited to the embodiments set forth herein; rather, these embodiments are provided so that this disclosure will satisfy applicable legal requirements. Like numbers refer to like elements throughout. As used in this specification and the claims, the singular forms "a," "an," and "the" include plural references unless the context clearly dictates otherwise.

As described herein, embodiments of the disclosure relate to methods for producing microcrystalline cellulose from tobacco, and related systems, apparatuses, and products. In this regard, microcrystalline cellulose can be employed in tobacco products such as smokeless tobacco products suitable for oral use. Microcrystalline cellulose is typically produced from wood products. However, Applicants have determined that it can be desirable to produce the microcrystalline cellulose from tobacco.

Dissolving grade pulp derived from tobacco is also provided herein. In this regard, the dissolving grade pulp described herein may be suitable for subsequent chemical conversion into other products beyond microcrystalline cellulose, including cellulose acetate, rayon, cellophase, cellulose nitrate, carboxymethyl cellulose, and viscose. In this regard, while the disclosure is generally described in relation to the production of microcrystalline cellulose, various other products may also be produced in accordance with the methods disclosed herein.

In a typical smokeless tobacco product, tobacco material can be cased and dried, and then ground to the desired form. For example, in some instances, the tobacco material formulation can be cased with an aqueous casing containing components such as sugars (e.g., fructose, glucose, and sucrose), humectants (e.g., glycerin and propylene glycol), flavoring ingredients (e.g., cocoa and licorice), and the like. Non-aqueous casing components can be applied to the tobacco in weight ratios of about 1 percent to about 15 percent. Note that weight ratios, as used herein, are based on the dry weight of the tobacco material unless otherwise described.

The tobacco material is typically used in a form that can be described as particulate (i.e., shredded, ground, granulated, or powder form). The manner by which the tobacco material is provided in a finely divided or powder type of form can vary. Preferably, plant parts or pieces are comminuted, ground or pulverized into a particulate form using equipment and techniques for grinding, milling, or the like. Most preferably, the plant material is relatively dry in form during grinding or milling, using equipment such as hammer mills, cutter heads, air control mills, or the like. For example, tobacco parts or pieces can be ground or milled when the moisture content thereof is less than about 15 weight percent or less than about 5 weight percent. Most preferably, the tobacco material is employed in the form of parts or pieces that have an average particle size less than about 50 microns. In one embodiment, the average particle size of the tobacco particles can be less than or equal to about 25 microns. In some instances, the tobacco particles can be sized to pass through a screen mesh. If desired, air classification equipment can be used to ensure that small sized tobacco particles of the desired sizes, or range of sizes, can be collected. If desired, differently sized pieces of granulated tobacco can be mixed together.

At least a portion of the tobacco material employed in the tobacco composition or product can have the form of an extract. Tobacco extracts can be obtained by extracting tobacco using a solvent having an aqueous character such as distilled water or tap water. As such, aqueous tobacco extracts can be provided by extracting tobacco with water, such that water insoluble pulp material is separated from the aqueous solvent and the water soluble and dispersible tobacco components dissolved and dispersed therein. The tobacco extract can be employed in a variety of forms. For example, the aqueous tobacco extract can be isolated in an essentially solvent free form, such as can be obtained as a result of the use of a spray drying or freeze drying process, or other similar types of processing steps. Alternatively, the aqueous tobacco extract can be employed in a liquid form, and as such, the content of tobacco solubles within the liquid solvent can be controlled by selection of the amount of solvent employed for extraction, concentration of the liquid tobacco extract by removal of solvent, addition of solvent to dilute the liquid tobacco extract, or the like. Exemplary techniques for extracting components of tobacco are described in U.S. Pat. No. 4,144,895 to Fiore; U.S. Pat. No. 4,150,677 to Osborne, Jr. et al.; U.S. Pat. No. 4,267,847 to Reid; U.S. Pat. No. 4,289,147 to Wildman et al.; U.S. Pat. No. 4,351,346 to Brummer et al.; U.S. Pat. No. 4,359,059 to Brummer et al.; U.S. Pat. No. 4,506,682 to Muller; U.S. Pat. No. 4,589,428 to Keritsis; U.S. Pat. No. 4,605,016 to Soga et al.; U.S. Pat. No. 4,716,911 to Poulose et al.; U.S. Pat. No. 4,727,889 to Niven, Jr. et al.; U.S. Pat. No. 4,887,618 to Bernasek et al.; U.S. Pat. No. 4,941,484 to Clapp et al.; U.S. Pat. No. 4,967,771 to Fagg et al.; U.S. Pat. No. 4,986,286 to Roberts et al.; U.S. Pat. No. 5,005,593 to Fagg et al.; U.S. Pat. No. 5,018,540 to Grubbs et al.; U.S. Pat. No. 5,060,669 to White et al.; U.S. Pat. No. 5,065,775 to Fagg; U.S. Pat. No. 5,074,319 to White et al.; U.S. Pat. No. 5,099,862 to White et al.; U.S. Pat. No. 5,121,757 to White et al.; U.S. Pat. No. 5,131,414 to Fagg; U.S. Pat. No. 5,131,415 to Munoz et al.; U.S. Pat. No. 5,148,819 to Fagg; U.S. Pat. No. 5,197,494 to Kramer; U.S. Pat. No. 5,230,354 to Smith et al.; U.S. Pat. No. 5,234,008 to Fagg; U.S. Pat. No. 5,243,999 to Smith; U.S. Pat. No. 5,301,694 to Raymond et al.; U.S. Pat. No. 5,318,050 to Gonzalez-Parra et al.; U.S. Pat. No. 5,343,879 to Teague; U.S. Pat. No. 5,360,022 to Newton; U.S. Pat. No. 5,435,325 to Clapp et al.; U.S. Pat. No. 5,445,169 to Brinkley et al.; U.S. Pat. No. 6,131,584 to Lauterbach; U.S. Pat. No. 6,284,875 to Turpen et al.; U.S. Pat. No. 6,298,859 to Kierulff et al.; U.S. Pat. No. 6,772,767 to Mua et al.; U.S. Pat. No. 6,817,970 to Berit et al.; U.S. Pat. No. 6,906,172 to Bratcher et al.; U.S. Pat. No. 7,034,128 to Turpen et al.; U.S. Pat. No. 7,048,211 to Bratcher et al.; and U.S. Pat. No. 7,337,782 to Thompson, all of which are incorporated by reference herein.

In certain embodiments, the tobacco material is prepared by subjecting at least a portion of a tobacco plant (e.g., leaves, seeds, flowers, stalks, roots, or stems) to a separation process, which typically can include multiple sequential extraction steps, in order to isolate desired components of the tobacco material. Exemplary separation processes include chromatography, distillation, filtration, recrystallization, solvent-solvent partitioning, cold pressing, solvent extraction (e.g., using solvents such as water, alcohols or hydrocarbons such as heptane or hexane), or a combination thereof. The resulting isolated tobacco component can be chemically transformed prior to use in the compositions of the disclosure. Exemplary chemical transformations include hydrogenation, esterification, transesterification, isomeric conversion, acetal formation, acetal decomposition, acid/base reaction, hydrolysis, thermal treatment, enzymatic treatment, and combinations of such steps. Techniques for preparing tobacco isolates for use in the compositions of the disclosure are set forth, for example, in US Pat. Pub. Nos. 2011/0174323 and 2011/0259353, both to Coleman, III et al., which are incorporated by reference herein in their entirety. Examples of the types of compounds that can be present in the tobacco isolate include hydrocarbons, cellulose, alcohols, aldehydes, ketones, carboxylic acids, amino acids, esters, lactones, anhydrides, carbohydrates (e.g., reducing sugars), phenols, quinones, ethers, nitriles, amines, amides, imides, plastid pigments, proteins, coenzyme-Q, pectin, starch, lignin, and lipids. Additional examples are described as natural tar diluents in PCT WO 2007/012980 to Lipowicz, which is incorporated by reference herein in its entirety. The type or function of a smokeless tobacco additional component prepared from a tobacco isolate will vary depending on the composition of the isolate, which can vary in part based on the extraction process employed, the portion of the tobacco plant involved, the type of chemical transformation utilized, and the like. Certain tobacco isolates can provide sugars, fillers, binders, disintegration or compressibility aids, or flavorants for the smokeless tobacco composition of the disclosure.

The relative amount of tobacco material within the smokeless tobacco composition can vary. Preferably, the amount of tobacco material formulation within the smokeless tobacco composition is at least about 10 percent or at least about 20 percent, on a dry weight basis of the composition, and including all sources of tobacco including any tobacco-derived components such as binders. In certain instances, the amounts of other components within the smokeless tobacco composition can exceed about 40 percent, on a dry weight basis. A typical range of tobacco material formulation within the smokeless tobacco composition is about 20 to about 50 dry weight percent.

The moisture content of the tobacco material formulation prior to mixing with any liquid substances to form the smokeless tobacco composition can vary. Most preferably, the moisture content of the tobacco material formulation is less than about 10 weight percent, and can be less than about 5 percent, and is often less than about 2.5 weight percent. The manner by which the moisture content of the tobacco material formulation is controlled can vary. For example the tobacco material formulation can be subjected to thermal or convection heating. As a specific example, the tobacco material formulation can be oven-dried, in warmed air at temperatures of about 40° C. to about 95° C. for a length of time appropriate to attain the desired moisture content. For example, the tobacco material formulation can be dried for about 12 hours to about 24 hours at about 54° C. to about 60° C.

According to some aspects, the tobacco particulate component of the composition can be replaced with other suitable botanical particulate components such as, for example, tea particulates, coffee particulates, herbal particulates, spice particulates and/or combinations thereof. The particulates can be typically provided in a powder form, which can be extracted from an appropriate botanical source.

Various additional components can be included in the smokeless tobacco compositions of the present invention.

The additional components can be artificial, or can be obtained or derived from herbal or biological sources. Exemplary types of additional components include salts (e.g., sodium chloride, potassium chloride, sodium citrate, potassium citrate, sodium acetate, potassium acetate, flour salt, and the like), natural sweeteners (e.g., fructose, sucrose, glucose, maltose, vanillin, ethylvanillin glucoside, mannose, galactose, lactose, stevia, and the like), artificial sweeteners (e.g., sucralose, sucrose, isomaltulose, saccharin, aspartame, acesulfame K, neotame and the like), organic and inorganic fillers (e.g., grains, processed grains, puffed grains, maltodextrin, dextrose, calcium carbonate, calcium phosphate, corn starch, lactose, sugar alcohols such as isomalt, maltitol, mannitol, xylitol, or sorbitol, finely divided cellulose, and the like), binders (e.g., povidone, sodium carboxymethylcellulose and other modified cellulosic types of binders, sodium alginate, xanthan gum, starch-based binders, gum arabic, gellan gum, lecithin, polydextrose, and the like), gelling agents (e.g., fish gelatin), pH adjusters or buffering agents (e.g., metal hydroxides, preferably alkali metal hydroxides such as sodium hydroxide and potassium hydroxide, and other alkali metal buffers such as metal carbonates, preferably potassium carbonate or sodium carbonate, or metal bicarbonates such as sodium bicarbonate, and the like), emulsifiers, colorants (e.g., dyes and pigments, including caramel coloring, titanium dioxide, and the like), humectants (e.g., glycerin, propylene glycol, and the like), oral care additional components (e.g., thyme oil, eucalyptus oil, and zinc), preservatives (e.g., potassium sorbate and the like), syrups (e.g., honey, high fructose corn syrup, corn syrup, and the like), disintegration or compressibility aids (e.g., microcrystalline cellulose, croscarmellose sodium, crospovidone, sodium starch glycolate, pregelatinized corn starch, and the like), flavorant and flavoring mixtures, antioxidants, and mixtures thereof. In some embodiments, one or more fats are added. The fat can function, for example, as a processing aid and/or to optimize the appearance of the smokeless tobacco product. For example, pre-melted fat such as partially hydrogenated soybean oil can be included in the composition. These and other exemplary types of additional components can include those described in, for example, U.S. Pat. No. 7,861,728 to Holton, et al.; US Pat. Pub. Nos. 2007/0062549 to Holton, et al. and 2010/0291245 to Gao et al., each of which is incorporated herein by reference.

Such additional components can be provided in a powder or granulated form for mixing with the tobacco material formulation, or otherwise can be provided in liquid form. Most preferably, the additional component when provided in a powder or granulated form is employed in the form of parts or pieces that have an average particle size less than about 50 microns. According to some aspects, the average particle size of the additional component can be about 25 microns or less. The moisture content of the additional components provided in a powder or granulated form can vary. Most preferably, the moisture content of the additional component provided in a powder or granulated form is less than about 10 weight percent, and can be less than about 5 percent, and is often less than about 2.5 weight percent. The additional component can be admixed with any component or with the particulate tobacco material in, for example, a mixer with a paddle prior to adding any liquid additional components. In the event additional liquid components are provided, the resultant mixture can still have a relatively low moisture content of less than about 10 weight percent, and can be less than about 5 percent, and is often less than about 2.5 weight percent. The relative amounts of the various additional component components within the smokeless tobacco product can vary.

The aforementioned types of additional components can be employed together (e.g., as additional component formulations) or separately (e.g., individual additional components can be added at different stages involved in the preparation of the final tobacco product). The relative amounts of the various components within the smokeless tobacco formulation can vary, and typically are selected so as to provide the desired sensory and performance characteristics to the tobacco product. Furthermore, the aforementioned types of additional components can be encapsulated as provided in the final product or composition. Exemplary encapsulated additional components are described, for example, in WO 2010/132444 A2 to Atchley, which has been previously incorporated by reference herein.

A sweetener component of the smokeless tobacco products of the present disclosure can be any sweetener, in natural or artificial form or as a combination of artificial and natural sweeteners. In one embodiment, sugar (i.e., sucrose) is the primary sweetener ingredient. In other embodiments, sucralose, maltodextrin, or corn syrup is the primary sweetener ingredient. In certain embodiments, both sucrose and corn syrup are used in the smokeless tobacco products. Other exemplary sweeteners are sugar alcohols. Sugar alcohols are polyols derived from monosaccharides or disaccharides that have a partially or fully hydrogenated form. Exemplary sugar alcohols have between about 4 and about 20 carbon atoms and include erythritol, arabitol, ribitol, isomalt, maltitol, dulcitol, iditol, mannitol, xylitol, lactitol, sorbitol, and combinations thereof (e.g., hydrogenated starch hydrolysates). When present, a representative amount of sweetener, whether an artificial sweetener and/or natural sugar or sugar alcohol, can make up at least about 5 percent, often at least about 10% and frequently at least about 15% of the total dry weight of the composition. Preferably, the amount of sweetener within the composition will not exceed about 40 percent, often will not exceed about 35 percent, and frequently will not exceed about 30 percent, of the total dry weight of the composition.

In some embodiments, the smokeless tobacco compositions of the disclosure also include at least one filler ingredient. In some embodiments, sugar alcohols are particularly advantageous as filler components in certain products of the disclosure because such materials contribute some sweetness and do not disrupt the chewable characteristics which can be desired in the final product. In some embodiments, a fondant filler is used. Fondant fillers typically comprise sugar, corn syrup, and water. One exemplary fondant filler composition consists of sugar, corn syrup, water, albumen, algin, citric acid, vanillin, sodium propionate, and potassium sorbate.

A filler component often fulfills multiple functions, such as enhancing certain organoleptic properties such as texture and mouthfeel, enhancing cohesiveness or compressibility of the product, and the like. When present, a representative amount of filler, whether an organic and/or inorganic filler, can make up at least about 1 percent, at least about 2 percent, or at least about 5 percent, based on the total dry weight of the composition. Preferably, the amount of filler within the composition will not exceed about 50 percent, often will not exceed about 40 percent, and frequently will not exceed about 30 percent of the total dry weight of the composition.

As used herein, "flavorant" or "flavoring agent" is any flavorful or aromatic substance capable of altering the sensory characteristics associated with the smokeless tobacco composition. Exemplary sensory characteristics that can be modified by the flavorant include, taste, mouthfeel, moistness, coolness/heat, and/or fragrance/aroma. The flavorants can be natural or synthetic, and the character of these flavors can be described as, without limitation, fresh, sweet, herbal, confectionary, floral, fruity or spice. Specific types of flavors include, but are not limited to, vanilla, coffee, chocolate, cream, mint (e.g., mint oil), spearmint, menthol, peppermint, wintergreen, lavender, cardamon, nutmeg, cinnamon, clove, cascarilla, sandalwood, honey, jasmine, ginger, anise, sage, licorice, lemon, orange, apple, peach, lime, cherry, and strawberry. Flavorants utilized in the disclosure also can include components that are considered moistening, cooling or smoothening agents, such as eucalyptus. These flavors can be provided neat (i.e., alone) or in a composite (e.g., spearmint and menthol or orange and cinnamon). In some instances, the flavorant can be provided in a spray-dried form or a liquid form. Flavorants are typically present in an amount of about 0.5 to about 10 dry weight percent, often about 1 to about 6 dry weight percent, and most often about 2 to about 5 dry weight percent.

A salt (e.g., sodium chloride, flour salt) can be employed in amounts sufficient to provide desired sensory attributes to the smokeless tobacco composition. When present, a representative amount of salt is at least about 0.5 dry weight percent or at least about 1.0 dry weight percent or at least about 1.5 dry weight percent, but will typically can make up less than about 5 percent of the total dry weight of the composition (e.g., about 0.5 to about 4 dry weight percent).

A humectant (e.g., glycerin) can be employed in amounts sufficient to provide desired moisture attributes to the smokeless tobacco composition. Further, in some instances, the humectant can impart desirable flow characteristics to the smokeless tobacco composition for depositing in a starch mould. When present, a representative amount of humectant is at least about 0.5 dry weight percent or at least about 1.0 dry weight percent or at least about 1.5 dry weight percent, but will typically make up less than about 5 percent of the total dry weight of the composition (e.g., about 0.5 to about 4 dry weight percent).

A binder (or combination of binders) can be employed in amounts sufficient to provide the desired physical attributes and physical integrity to the smokeless tobacco composition. A representative amount of binder can make up at least about 5 percent or at least about 10 percent of the total dry weight of the composition. In certain embodiments, the binder component(s) of the composition will be present in an amount of at least about 15 dry weight percent or at least about 20 dry weight percent or at least about 25 dry weight percent. Preferably, the total amount of binder within the composition will not exceed about 45 percent of the total dry weight of the composition. Often, the amount of binder within a desirable composition will not exceed about 40 percent, and frequently will not exceed about 35 percent, of the total dry weight of the composition.

In certain embodiments, the binder material includes a natural gum. As used herein, a natural gum refers to polysaccharide materials of natural origin that are useful as thickening or gelling agents. When present, natural gum binder materials are typically present in an amount of at least about 15 dry weight percent or at least about 20 dry weight percent or at least about 25 dry weight percent. Representative natural gums derived from plants, which are typically water soluble to some degree, include xanthan gum, guar gum, gum arabic, ghatti gum, gum tragacanth, karaya gum, locust bean gum, gellan gum, alginates, carrageenan, agar, pullalan, and combinations thereof.

Preferred buffering agents buffer within a pH range of about 6 to about 10, and exemplary buffering agents include metal hydroxides, metal carbonates, metal bicarbonates, or mixtures thereof. The buffering agent is typically present in an amount less than about 1 percent based on the dry weight of the formulation.

The manner by which the various components of the smokeless tobacco composition are combined can vary. The various components of the smokeless tobacco composition can be contacted, combined, or mixed together in conical-type blenders, mixing drums, ribbon blenders, or the like, such as a Hobart mixer. As such, the overall mixture of various components with the powdered tobacco components can be relatively uniform in nature. See also, for example, the types of methodologies set forth in U.S. Pat. No. 4,148,325 to Solomon et al.; U.S. Pat. No. 6,510,855 to Korte et al.; and U.S. Pat. No. 6,834,654 to Williams, each of which is incorporated herein by reference.

The compositions of the smokeless tobacco products of the present disclosure can be dissolvable. As used herein with respect to tobacco products, the terms "dissolve," "dissolving," and "dissolvable" refer to compositions having aqueous-soluble components that interact with moisture in the oral cavity and enter into solution, thereby causing gradual consumption of the product.

According to one aspect, the dissolvable smokeless tobacco product is capable of lasting in the use's mouth for a given period of time until it completely dissolves. Dissolution rates of the present smokeless tobacco products can vary over a wide range, from less than about 1 minute to about 60 minutes. For example, fast release compositions typically dissolve and/or release the active component in less than about 2 minutes, often less than about 1 minute (e.g., less than about 50 seconds, less than about 40 seconds, less than about 30 seconds, or less than about 20 seconds). Dissolution can occur by any means, such as melting, mechanical disruption (e.g., chewing), enzymatic or other chemical degradation, or by disruption of the interaction between the components of the product. In some embodiments, the products can be meltable as discussed, for example, in US Pat. Pub. No. 2012/0037175 to Cantrell et al., which is incorporated by reference herein in its entirety. In other embodiments, the compositions do not dissolve during the smokeless tobacco product's residence in the user's mouth.

In certain embodiments, the products of the disclosure are characterized by sufficient cohesiveness to withstand light chewing action in the oral cavity without rapidly disintegrating. Certain products of the disclosure typically do not exhibit a highly deformable chewing quality as found in conventional chewing gum. In certain embodiments, the product can temporarily adhere to a part of the oral mucosa.

The smokeless tobacco product can be provided in any suitable predetermined shape or form. For example, in some embodiments, the smokeless tobacco product is provided in the form having a general shape of a pill, pellet, tablet, coin, bead, ovoid, obloid, cube, film, flake, stick, foam, gel, or the like. In some embodiments, the shape is determined by the shape of the mold in which the product is formed. Individual compositions can be sized such that they fit entirely in the user's mouth, or such that they fit only partially in the mouth. Thus, the preferred dimensions can vary.

Although the foregoing description focuses on compositions that are uniform throughout each product unit, products can also be formed with multiple different formulations having different properties in the same product unit. For example, two different compositions can be deposited in a single mold to produce a layered product. Still further, two different compositions could be co-extruded to form a product with different characteristics across its cross-section. Such a process could be used to provide a product with two different compositions featuring different dissolution rates such that a first portion of the product dissolves at a first rate (e.g., a faster rate) and a second portion dissolves at a second, slower rate.

Products of the present disclosure can be packaged and stored in any suitable packaging. See, for example, the various types of containers for smokeless types of products that are set forth in U.S. Pat. No. 7,014,039 to Henson et al.; U.S. Pat. No. 7,537,110 to Kutsch et al.; U.S. Pat. No. 7,584,843 to Kutsch et al.; U.S. Pat. No. 7,878,324 to Bellamah et al.; U.S. Pat. No. 7,946,450 to Gelardi et al.; D592,956 to Thiellier D594,154 to Patel et al.; and D625,178 to Bailey et al.; US Pat. Pub. Nos. 2008/0173317 to Robinson et al.; 2009/0014343 to Clark et al.; 2009/0014450 to Bjorkholm; 2009/0223989 to Gelardi; 2009/0230003 to Thiellier; 2010/0084424 to Gelardi; 2010/0133140 to Bailey et al; 2010/0264157 to Bailey et al.; 2011/0168712 to Bailey et al.; and 2011/0204074 to Gelardi et al., which are incorporated herein by reference.

As described above, tobacco products, including smokeless tobacco products, can include various components including binders, fillers, texturizers, cellulose ethers, cellulose esters, viscose, rayon, TENCEL® cellulose-based fibers, starches, and maltodextrin. In some embodiments these components can comprise microcrystalline cellulose. Microcrystalline cellulose is dissolvable, and hence it can be desirable for use as one of the various components of smokeless tobacco products.

Microcrystalline cellulose is purified, partially depolymerized cellulose. Cellulose is a naturally occurring polymer comprised of glucose units connected by a 1-4 beta glycosidic bond. Linear chains of cellulose are bundled together as microfibril in the walls of plant cells. Each microfibril defines a crystalline structure that is insoluble in water and resistant to reagents. However, microfibrils include amorphous regions with weaker internal bonding. The crystalline structure is isolated to produce microcrystalline cellulose.

Microcrystalline cellulose can only be produced from alpha cellulose (also known as "chemical cellulose"), which is a highly refined, insoluble, relatively higher molecular weight cellulose from which sugars, pectin, and other soluble materials have been removed. With respect to other types of cellulose, beta cellulose is defined as a more degraded form of cellulose, with less crystalline regions. Further, gamma cellulose is defined as short-chain hemicelluloses. Thus, beta cellulose and gamma cellulose are typically removed from an input employed to produce microcrystalline cellulose.

In the production of microcrystalline cellulose, alpha cellulose can initially be shredded and then immersed in a hot bath of mineral acid to dissolve the amorphous regions of the microfibrils while leaving the microcrystalline structures intact. The microcrystalline structures can then be subjected to hydrolysis to break down long polymer chains until the degree of polymerization decreases and levels off to a desired extent. Chemicals and impurities can then be removed through water-washing followed by drying. The resulting microcrystalline cellulose can be embodied as a fine white crystallized powder in raw form.

Microcrystalline cellulose is typically produced from wood pulp. However, as described above, Applicants have determined that it can be desirable to instead produce microcrystalline cellulose from tobacco. Microcrystalline cellulose has typically been produced from wood pulp, instead of from tobacco inputs, because the cellulose content of wood is generally higher than in tobacco plants. Further, processing tobacco to produce microcrystalline cellulose presents unique challenges in term of breaking down the cellulose to achieve a desired degree of polymerization, as described below in the Experimental section.

Accordingly, the present disclosure provides methods for producing microcrystalline cellulose from a tobacco input and corresponding microcrystalline cellulose products produced from a tobacco input. More particularly, in some embodiments the tobacco input can comprise one or more tobacco plant components including leaves, seeds, flowers, stalks, roots, and/or stems. For example, as described below, in some embodiments the tobacco input can comprise flue-cured tobacco stalks, burley tobacco stalks, and/or whole-plant tobacco biomass (e.g., extracted green tobacco biomass). With regard to the stalk and related biomass, it is noted that these materials are not presently known by Applicants to have any commercially viable use after liquid extraction therefrom.

Further, in some embodiments the tobacco input can comprise reconstituted tobacco. One type of method for producing a reconstituted tobacco involves the use of paper-making techniques. In a typical paper-making reconstituted tobacco process, tobacco is extracted with water, and the resulting aqueous extract and water insoluble pulp are separated from one another. The pulp portion can be refined to a desired consistency, and formed into a mat or web, much like wood pulp fibers in a traditional paper making process. The aqueous tobacco extract is applied to the mat of insoluble pulp, and the overall resulting mixture is dried to provide a reconstituted tobacco sheet incorporating the tobacco components from which that sheet can be derived. Typically, tobacco stems are used in making such a reconstituted tobacco sheet, because the fibrous nature of those stems provides strength and structural integrity to the resulting sheet. See, for example, U.S. Pat. No. 3,398,754 to Tughan; U.S. Pat. No. 3,847,164 to Mattina; U.S. Pat. No. 4,131,117 to Kite; U.S. Pat. No. 4,270,552 to Jenkins; U.S. Pat. No. 4,308,877 to Mattina; U.S. Pat. No. 4,341,228 to Keritsis; U.S. Pat. No. 4,421,126 to Gellatly; U.S. Pat. No. 4,706,692 to Gellatly; U.S. Pat. No. 4,962,774 to Thomasson; U.S. Pat. No. 4,941,484 to Clapp; U.S. Pat. No. 4,987,906 to Young; U.S. Pat. No. 5,056,537 to Brown; U.S. Pat. No. 5,143,097 to Sohn; U.S. Pat. No. 5,159,942 to Brinkley et al.; U.S. Pat. No. 5,325,877 to Young; U.S. Pat. No. 5,445,169 to Brinkley; U.S. Pat. No. 5,501,237 to Young; and U.S. Pat. No. 5,533,530 to Young, which are incorporated herein by reference.

Production of microcrystalline cellulose from tobacco can involve a number of operations. In this regard, microcrystalline cellulose may be produced from dissolving grade pulp, which may be produced in accordance with the operations illustrated in FIG. 1. Dissolving grade pulp is pulp which comprises a sufficient percentage of alpha cellulose necessary for the production of microcrystalline cellulose (e.g., greater than 85% by weight, typically greater than 88%, or more typically greater than 90% alpha cellulose). The quantity of hemicelluloses (complex polymers composed of various five and six-carbon sugars in a highly branched structure) may also be low (e.g., from about 0.5% to about 10% by weight) in dissolving grade pulp. Additionally, the quantity of lignin in dissolving grade pulp may also be very low (e.g., from about 0% to about 0.2% by weight). Further characteristics of dissolving grade pulp may include: pentosan (from about 0% to about 5% by weight), ash (from about 0% to about 0.15% by weight), alcohol-benzene extractives (from about 0% to about 0.5% by weight), brightness (about 85% or greater), viscosity (from about 5% to about 25%, 1% Cuprammonium), and a copper number from about 0.1 to about 1.2.

For example, as illustrated in FIG. 1, in one embodiment the method can comprise chemical pulping (e.g., soda pulping) a tobacco input to form a tobacco pulp at operation 100. Briefly, chemical pulping at operation 100 can comprise combining the tobacco input with a strong base (e.g., one or more of sodium hydroxide, potassium hydroxide, sodium carbonate, sodium bicarbonate, potassium carbonate, potassium bicarbonate, ammonium hydroxide, ammonium bicarbonate, and ammonium carbonate) at operation 102 and heating the tobacco input and the base at operation 104. Further, the method can include exposing the tobacco pulp to a bleaching agent at operation 106. Optionally, as indicated by boxes with dashed lines, bleaching the tobacco pulp at operation 106 can comprise chlorination of the tobacco pulp with a chlorine dioxide solution at operation 108 and caustic extraction of the tobacco pulp with a second strong base (e.g., one or more of sodium hydroxide, potassium hydroxide, sodium carbonate, sodium bicarbonate, potassium carbonate, potassium bicarbonate, ammonium hydroxide, ammonium bicarbonate, and ammonium carbonate) at operation 110. As used herein, a strong base refers to a basic chemical compound (or combination of such compounds) that is able to deprotonate very weak acids in an acid-base reaction. Note that the strong base employed in caustic extraction at operation 108 (the "second strong base") may or may not be the same as the strong base employed in chemical pulping at operation 100.

Accordingly, the method described above provides operations configured to produce dissolving grade pulp from tobacco. However, the method can include one or more additional operations in some embodiments. For example, FIG. 2 includes the operations of FIG. 1 in addition to various other optional operations, including operations configured to produce microcrystalline cellulose from the dissolving grade pulp. These optional operations are indicated by boxes defining dashed lines in FIG. 2.

In this regard, the method can further comprise drying the tobacco input at operation 112 prior to chemical pulping the tobacco input at operation 100. Further, the method can include depithing the tobacco input at operation 114 prior to chemical pulping the tobacco input at operation 100. Depithing, or decorticating the tobacco input at operation 114 can be conducted to remove pith (which comprises lignin) from the tobacco input manually, and thus reduce the amount of chemicals needed to delignify the tobacco input during the chemical pulping and bleaching operations 100, 106. In some embodiments, depithing or decorticating may be conducted in accordance with processes conducted by Schweitzer Mauduit International, headquartered in Alpharetta, Ga. Additionally, the method can include milling the tobacco input at operation 116, which can be conducted prior to chemical pulping the tobacco input at operation 100. Milling the tobacco input at operation 116 can be conducted after depithing the tobacco input at operation 114. In this regard, manual or mechanical removal of the pith can be relatively easier with larger pieces of the tobacco input, though the method can be conducted in other sequences in other embodiments. Milling the tobacco input at operation 116 can be conducted to increase the surface area of the tobacco input such that the chemical pulping and bleaching operations 100, 106 can act upon the greater surface area to increase the efficacy thereof.

As noted above, chemical pulping at operation 100 can involve use of chemicals (see, e.g., operation 102) and heat (see, e.g., operation 104) to break down the lignin in the tobacco input, which binds the cellulose fibers together, without seriously degrading the cellulose fibers. In this regard, in the paper industry, economics dictate that the bulk of the non-cellulosic material in wood be removed using chemical pulping, which can involve use of relatively less expensive chemicals than those employed in other stages of treatment of pulp, such as those employed in bleaching the tobacco pulp at operation 106. Further, depithing at operation 114 can physically reduce the quantity of lignin in the tobacco input.

As further noted above, chemically pulping the tobacco input at operation 100 can comprise combining the tobacco input with a strong base such as sodium hydroxide (NaOH) at operation 102. In some embodiments, the weight of the strong base can be greater than about 5%, greater than about 25%, or greater than about 40% of the weight of the tobacco input. In certain embodiments, the weight of the strong base can be less than about 60% or less than about 50% of the weight of the tobacco input. In still further embodiments, the weight of the strong base can be from about 5% to about 50%, or from about 30% to about 40% of the weight of the tobacco input. Various other chemicals and weight ratios thereof can also be employed to chemically pulp the tobacco input in other embodiments.

As additionally noted above, chemically pulping the tobacco input at operation 100 can include heating the tobacco input and the strong base at operation 104. Heating the tobacco input and the strong base at operation 104 can be conducted to increase the efficacy of the chemical pulping operation 100. In this regard, an increase in either cooking temperature or time will result in an increased reaction rate (rate of lignin removal). To make calculations involving chemical pulping simpler, chemical pulping is herein discussed in terms of a parameter called the H-factor, which takes into account both the temperature and time of the chemical pulping operation. The equation for calculating an H-factor is provided below:

$$H=\int_0^t \exp(43.2-16115/T)dt, \quad \text{(Equation 1)}$$

wherein:
T=temperature (in Kelvin), and
t=time (in minutes).

Thus, the H-factor refers to the area contained by a plot of reaction rate versus time. In some embodiments heating the tobacco input and the base at operation 104 can be conducted with an H-factor greater than 500, an H-factor greater than about 900, an H-factor greater than 2,000, an H-factor less than 3,500, an H-factor from about 500 to about 3,300, an H-factor from about 900 to about 1,110, or an H-factor from about 1,000 to about 2,500. Further, in some embodiments the tobacco input and the strong base can be heated to a maximum temperature greater than about 150° C., greater than about 175° C., from about 150° C. to about 180° C., or from about 160° C. to about 170° C. The maximum temperature can be reached at greater than about 45 minutes, greater than about 60 minutes, less than about 65 minutes, from about 60 to about 65 minutes, or from about 55 to about 70 minutes.

In some embodiments chemical pulping a tobacco input at operation 100 can be considered "mild" when the strong base is provided in a weight ratio less than about 30% by weight of the tobacco input. Mild chemical pulping may be conducted with an H-factor less than about 900 in some embodiments. Chemical pulping a tobacco input at operation 100 may be considered "moderated" when the strong base is from about 30% to about 40% by weight. Moderate chemical pulping may be conducted with an H-factor from about 900 to about 1,100. Chemical pulping a tobacco input at operation 100 may be considered "harsh" when the strong base is greater than about 40% by weight. Harsh chemical pulping may be conducted, for example, with an H-factor greater than about 1,100. Various other H-factors, temperatures, and times can be employed in other embodiments, as discussed in greater detail below.

In some embodiments chemical pulping the tobacco input at operation 100 can further comprise combining the tobacco input with anthraquinone at operation 118. The anthraquinone can have a weight greater than about 0.025%, greater than about 0.05%, less than about 0.4%, from about 0.1% to about 0.2%, or from about 0.05% to about 0.4% of the tobacco input in some embodiments, although various other weight ratios can be employed in other embodiments. Anthraquinone can be employed in the chemical pulping operation 100 in an attempt to provide a higher yield by protecting carbohydrates from the strong base during delignification.

The conditions during chemical pulping at operation 100 can be further configured to in increase the rate of lignin removal. For example, chemical pulping the tobacco input at operation 100 can be conducted in a pressurized vessel in some embodiments. A positive pressure can increase chemical penetration into the tobacco input. Additionally, as illustrated at operation 120, the method can further comprise agitating the tobacco input. Agitating the tobacco input can increase and equalize exposure of each piece of the tobacco input to the chemicals employed in chemical pulping at operation 100. Example embodiments of vessels that can be employed during chemical pulping include a rotary globe digester, a finger reactor with internal rotating tines, a stationary batch digester, a hot-blow stationary batch digester, an orbital globe digester, and a rotating digester. Accordingly, chemical pulping of the tobacco input at operation 100 can be conducted in a variety of configurations with a variety of parameters in order to reduce lignin content.

After chemical pulping at operation 100, the method can also include bleaching the tobacco pulp to produce a dissolving grade pulp at operation 106. However, in some embodiments one or more operations can be conducted after the chemical pulping operation 100 and before the bleaching operation 106. For example, in some embodiments the method can also include mixing water with the tobacco pulp to form a slurry at operation 122 and filtering the slurry with a filter such that a portion of the tobacco pulp is removed at operation 124.

Mixing water with the tobacco pulp to form a slurry at operation 122 and filtering the slurry at operation 124 can be conducted to remove some of the non-cellulosic materials, such as pith, parenchyma, and tissue from the tobacco pulp. In some embodiments the portion of the tobacco pulp that is removed in the filtering operation 124 can define a weight that is greater than about 5%, greater than about 15%, greater than about 25%, less than about 30%, or from about 0% to about 30% of the weight of the tobacco pulp prior to filtering. The filter can comprise any apparatus configured to separate the tobacco pulp based on the size of the components thereof. For example in one embodiment the filter can comprise a screen defining a plurality of apertures having a maximum dimension up to about 0.005 inches, up to about 0.01 inches, up to about 0.02 inches, greater than about 0.005 inches, greater than about 0.0075 inches, from about 0.005 inches to about 0.02 inches, or from about 0.0075 inches to about 0.015 inches. However, various other filters and sizes of apertures can be employed in other embodiments.

In some embodiments filtering the slurry at operation 124 can comprise receiving a first portion of the tobacco pulp through the filter at operation 126 and receiving a second portion of the tobacco pulp through the filter 128 after receiving the first portion. In one embodiment, at least the second portion of the tobacco pulp can be subjected to the bleaching. In some embodiments the first portion of the tobacco pulp can be additionally or alternatively subjected to bleaching. As will be described below, the filtering operations can be configured to separate out tobacco pulp having a relatively higher alpha-cellulose content for use in the production of microcrystalline cellulose.

In some embodiments, the method can further comprise removing at least a portion of the water from the tobacco pulp received through the filter at operation 130. This operation 130 can occur prior to bleaching the tobacco pulp at operation 106. By removing water from the tobacco pulp, the tobacco pulp can be bleached at operation 106 with use of less chemicals by allowing for more concentrated application thereto.

Accordingly, the tobacco pulp can be prepared for bleaching at operation 106 in accordance with one or more of the above-described operations. The bleaching operation 106 can be conducted to remove the residual non-cellulosic materials left over after chemical pulping at operation 100 without damaging the cellulose. Exemplary processes for treating tobacco with bleaching agents are discussed, for example, in U.S. Pat. No. 787,611 to Daniels, Jr.; U.S. Pat. No. 1,086,306 to Oelenheinz; U.S. Pat. No. 1,437,095 to Delling; U.S. Pat. No. 1,757,477 to Rosenhoch; U.S. Pat. No. 2,122,421 to Hawkinson; U.S. Pat. No. 2,148,147 to Baier; U.S. Pat. No. 2,170,107 to Baier; U.S. Pat. No. 2,274,649 to Baier; U.S. Pat. No. 2,770,239 to Prats et al.; U.S. Pat. No. 3,612,065 to Rosen; U.S. Pat. No. 3,851,653 to Rosen; U.S. Pat. No. 3,889,689 to Rosen; U.S. Pat. No. 4,143,666 to Rainer; U.S. Pat. No. 4,194,514 to Campbell; U.S. Pat. No. 4,366,824 to Rainer et al.; U.S. Pat. No. 4,388,933 to Rainer et al.; and U.S. Pat. No. 4,641,667 to Schmekel et al.; and PCT WO 96/31255 to Giolvas, all of which are incorporated by reference herein.

As noted above, in one embodiment, bleaching the tobacco pulp at operation 106 can comprise chlorination of the tobacco pulp with a chlorine dioxide solution at operation 108 and caustic extraction of the tobacco pulp (e.g., with a strong based such as sodium hydroxide) at operation 110. Various alternate and additional chemicals can also be employed to bleach the tobacco input in other embodiments. For example, the chlorine dioxide solution can further comprise sulfuric acid. Other alternate or additional bleaching chemicals include sodium chlorate, chlorine, hydrogen peroxide, oxygen, ozone, sodium hypochlorite, hydrochlorous acid, hydrochloric acid, phosphoric acid, acetic acid, nitric acid, and sulphite salts. In embodiments employing chlorine, chlorate, or chlorite, chlorine dioxide may be produced by exposure of these chemicals to acidic conditions.

Further, chlorination of the tobacco pulp with a chlorine dioxide solution at operation 108 can comprise in situ acidification of sodium chlorite at operation 132. In this regard, in situ acidification can be configured to reduce the possibility of explosion or other unintended adverse reaction as compared to methods involving forming the chlorine dioxide solution separately and then applying it to the tobacco pulp. A formula can be developed that takes into account the oxidizing equivalents released when this acid chlorite is employed in bleaching:

$$80\% \text{ Sodium Chlorite Required}(gr.) = (\text{dry tobacco pulp}(gr.)) \times (\% \text{ ClO}_2 \text{ on dry tobacco pulp}) \times (0.021) \quad \text{(Equation 2)}:$$

Additionally, the method can include agitating the tobacco pulp at operation 134 during chlorination of the tobacco pulp with the chlorine dioxide solution at operation 108. Agitating the tobacco pulp can increase the effectiveness of the chlorine dioxide solution in delignifying the tobacco pulp by ensuring more uniform exposure of the tobacco pulp to the chlorine dioxide solution.

Figure 2:
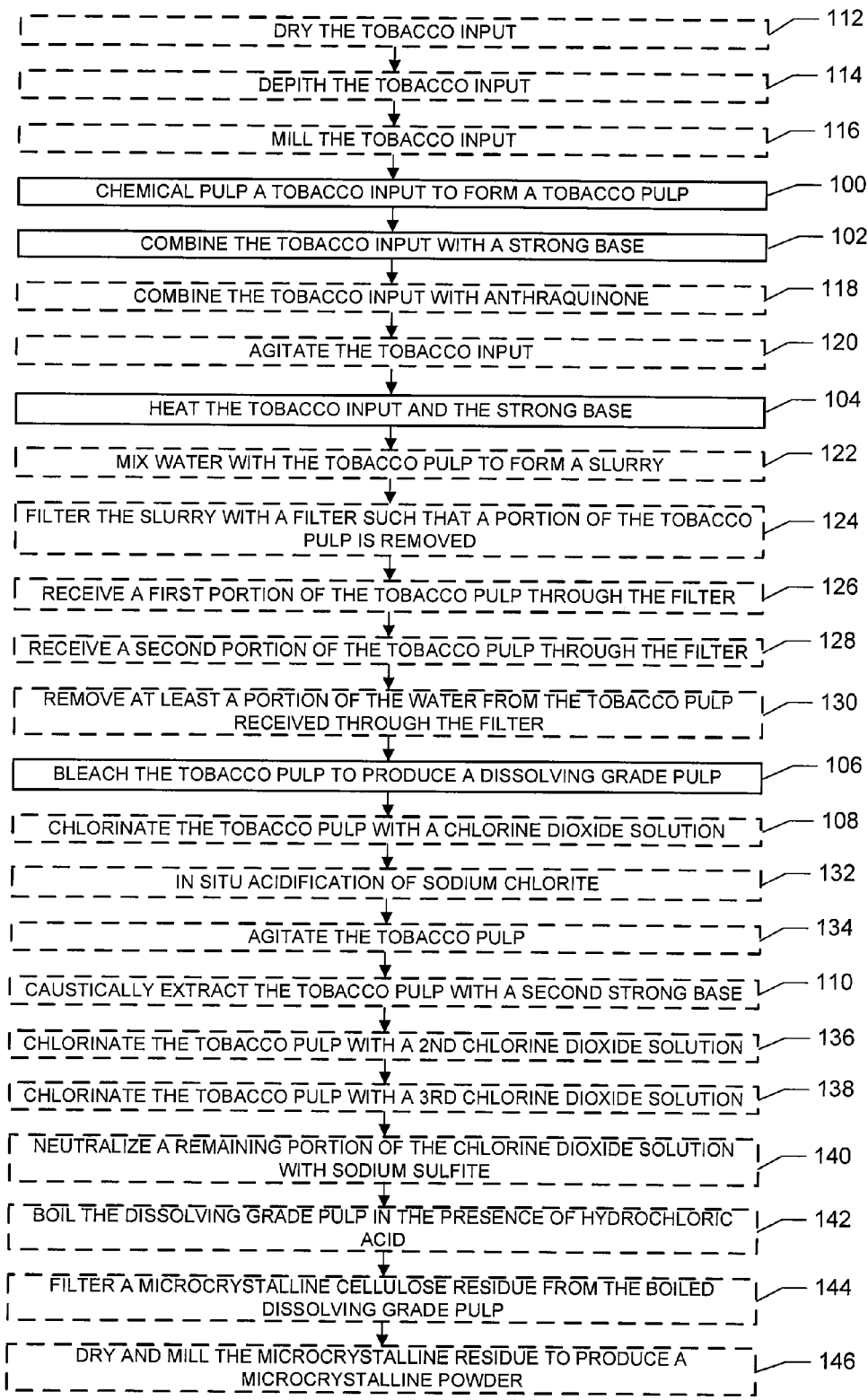
FIG. 2 is a block diagram of a method for producing microcrystalline cellulose that incorporates the operations for producing dissolving grade pulp from FIG. 1 according to an example embodiment.

In one embodiment bleaching the tobacco pulp at operation 106 can comprise an ordered sequence, which can include one or more additional chlorination or caustic extraction stages. For example, as illustrated in FIG. 2, after chlorination of the tobacco pulp with a chlorine dioxide solution at operation 108 and caustic extraction of the tobacco pulp at operation 110, the method can also include chlorination of the tobacco pulp with a chlorine dioxide solution (e.g., a second chlorine dioxide solution) at operation 136. In some embodiments after the second chlorination operation 136, the method can further comprise a third chlorination operation 138, in which chlorination of the tobacco pulp with a chlorine dioxide solution (e.g., a third chlorine dioxide solution) also occurs. In this regard, Applicants have determined that one or more additional chlorination operations 136, 138 can provide further delignification, when conducted after caustic extraction at operation 110. Each of the additional chlorination operations 136, 138, can comprise in situ acidification of sodium chlorite and agitating the tobacco pulp, as described above with respect to operations 132, 134. The components and concentrations of the chlorination solutions employed in the various chlorination operations 108, 136, 138 can be the same or differ from one another.

The various bleaching operation 106 can be described in an abbreviated form as follows. However, it should be understood that these bleaching operations are described for example purposes only. In this regard, the bleaching operations may differ from those described below:

"D"—treatment with chlorine dioxide ($ClO_2$) under acidic conditions, to attack and fragment lignin and other oxidizable materials. Instead of adding $ClO_2$ solution directly to the raw material, sodium chlorite can be first mixed into the slurry, followed by acidification to liberate the $ClO_2$ gas in situ. In one example embodiment, the D stage can occur over the course of greater than about 0.5 hours, about 1 hour, less than about 1.5 hours, or from about 0.5 hours to about 1.5 hours. The D stage can be conducted at a temperature greater than about 60° C., about 70° C., about 80° C., less than about 90° C., or from about 60° C. to about 90° C. The $ClO_2$ can define a weight that is greater than about 3%, less than about 30%, or from about 3% to about 30% of the tobacco pulp. In some embodiments the D stage can also include exposure of the tobacco pulp to a strong acid such as sulfuric acid ($H_2SO_4$). The sulfuric acid can define a weight that is greater than about 3%, greater than about 8%, less than about 20%, or from about 5% to about 20% of the weight of the tobacco pulp. The consistency of the mixture in the D stage can be greater than 1%, less than 7%, or from about 1% to about 10%. In this regard, "consistency" is a paper industry term used for percentage of solids in a reaction mixture. For example, bleaching at 6% consistency would use 6 dry grams of treated material for every 94 grams of water and chemical mixed therewith.

"E"—treatment with a strong base such as sodium hydroxide (NaOH), to solubilize small-to-intermediate sized lignin fragments generated during oxidation. Lignin fragments are normally not soluble under acidic conditions, so most bleaching stages done at low pH can be followed by an E stage. In one example embodiment, the E stage can occur over the course of greater than about 0.5 hours, about 1 hour, about 1.5 hours, less than about 2 hours, or from about 0.5 hours to about 2 hours. The E stage can be conducted at a temperature greater than about 60° C., about 70° C., about 80° C., less than about 90° C., or from about 60° C. to about 90° C. The NaOH can define a weight that is greater than about 1%, less than about 15%, or from about 1.5% to about 10% of the tobacco pulp. The consistency of the mixture in the E stage can be greater than 1%, less than 7%, or from about 1% to about 10%.

"Ep"—an E stage with hydrogen peroxide ($H_2O_2$) or other oxidizing agent added for increased brightness and lignin removal. The Ep stage can be substantially similar to the above-described D stage. Further the $H_2O_2$ can define a weight that is greater than about 1%, less than about 15%, or from about 5% to about 15% of the tobacco pulp. Other example oxidizing agents include oxygen, ozone, hypochlorites, and peroxide.

The method can include various other operations, including neutralizing a remaining portion of the chlorine dioxide solution with sodium sulfite at operation 140. In one embodiment neutralizing a remaining portion of the chlorine dioxide solution at operation 140 can be conducted after chlorination of the tobacco pulp at operation 108, after chlorination of the tobacco pulp at operation 136, and again after chlorination of the tobacco pulp at operation 138. In another embodiment, neutralizing a remaining portion of the chlorine dioxide solution at operation 140 can be conducted after the entirety of the bleaching operation 106 is complete, as illustrated in FIG. 2. Neutralizing the remaining portion of the chlorine dioxide solution can be conducted to prepare the dissolving grade pulp for operations whereby the alpha cellulose in the dissolving grade pulp is converted into microcrystalline cellulose.

In this regard, after completion of bleaching the tobacco pulp at operation 106, the method can further comprise boiling the dissolving grade pulp in the presence of hydrochloric acid (HCl) (e.g., 2N HCl) to produce a boiled dissolving grade pulp at operation 142. Boiling the dissolving grade pulp in the presence of hydrochloric acid at operation 142 can be conducted to hydrolyze amorphous cellulose and produce a solution containing microcrystalline cellulose. After boiling the dissolving grade pulp in the presence of hydrochloric acid at operation 142, the method can also include filtering a microcrystalline cellulose residue from the boiled dissolving grade pulp at operation 144. Thereby, the microcrystalline cellulose residue can be separated from a filtrate that passes through the filter. The microcrystalline residue can be dried and milled to produce a microcrystalline powder at operation 146.

In this regard, a microcrystalline cellulose product is also provided herein. The microcrystalline cellulose product can comprise a tobacco input, wherein the tobacco input is subjected to a plurality of operations, such as one or more of the operations described above. For example, the operations conducted on the tobacco input can include chemical pulping (e.g., soda pulping) the tobacco input to form a tobacco pulp, wherein chemical pulping the tobacco input comprises, for example: combining the tobacco input with a strong base, and heating the tobacco input and the strong base. Further, the operations can include bleaching the tobacco pulp to produce a dissolving grade pulp, wherein bleaching the tobacco pulp comprises, for example: chlorination of the tobacco pulp with a chlorine dioxide solution, and caustic extraction of the tobacco pulp with a second strong base. However, as noted above, the operations employed to form the microcrystalline cellulose from the tobacco input can vary in accordance with the remainder of the disclosure.

Additionally, a tobacco product is provided herein. The tobacco product can comprise a tobacco material and a microcrystalline cellulose product derived from a tobacco input. For example, the microcrystalline cellulose product derived from the tobacco input can be produced in accordance with the above-described operations. In some embodiments the tobacco product can be embodied as a smokeless tobacco product. In this regard, the microcrystalline cellulose product can be configured as a binder, a filler, dispersant, film former, flavor carrier and/or a texturizer or other component of a smokeless tobacco product. For example, once the microcrystalline cellulose is produced from the tobacco input, standard operations employed in the manufacturer of components of smokeless tobacco articles can be used to create these components from the tobacco-derived microcrystalline cellulose. However, the tobacco-derived microcrystalline product can also be used in other articles beyond smokeless tobacco products. For example, the tobacco-derived microcrystalline cellulose could be used as a carrier for nicotine in a tobacco product as described in US Pat. Pub. Nos. 2004/0191322 to Hansson; 2010/0061940 to Axelsson et al.; and 2010/0004294 to Axelsson et al., each of which is incorporated by reference herein. Further, tobacco-derived microcrystalline cellulose may be employed in other applications such as food products and pharmaceutical products.

Accordingly, the above-described operations can be employed to produce a microcrystalline cellulose product from a tobacco input, which can be embodied in a variety of forms. In this regard, in general, the chemical pulping and bleaching operations 100, 106 are employed to break down lignin in the tobacco input and isolate alpha cellulose. Accordingly, the relative severity of the chemical pulping and bleaching operations 100, 106 can be adjusted relative to one-another to result in a product comprising a suitable percentage of alpha cellulose (e.g., greater than 85%, greater than 88%, or greater than 90% alpha cellulose). Additionally, mechanical operations such as filtering at operation 124 can be employed to offset relatively mild chemical pulping at operation 100 and/or relatively mild bleaching at operation 106.

For example, in one embodiment a relatively mild chemical pulping operation 100 can be combined with filtering out a relatively high proportion of rejects at operation 124. In a second embodiment, a moderate chemical pulping operation 100 and a moderate bleaching operation 106 can be combined with fractionation of the tobacco pulp through multiple filtering operations 126, 128. Alternatively, in a third embodiment a harsh chemical pulping operation 100 can be combined with a moderate bleaching operation 106. In this regard, Applicant herein provides three example embodiments of the above-described operations that can be employed to produce a dissolving grade pulp that can define suitable characteristics for the production of microcrystalline cellulose.

Various conditions and related terminology are described in these example embodiments. In this regard, the test used for determining the lignin content of a substance is the "Kappa number" test, which consists of oxidation of the tested substance with potassium permanganate, followed by titration of the reaction liquid to see how much of the applied permanganate can be consumed. Lignin can be easily oxidized this way, while carbohydrates (e.g., hemicellulose and cellulose) cannot. Ideally, a "pure" cellulose or carbohydrate material should have a Kappa number less than 1.

The "Kappa Factor" is used to ensure that the same amount of bleaching is done in a chlorine dioxide (D) stage, regardless of the Kappa number (lignin content) of the incoming pulp. That is, the bleaching operation 100 calls for more chlorine dioxide to be applied as the incoming Kappa number increases. The following formula applies:

$$\% \text{ ClO}_2 \text{ on Dry Tobacco Pulp} = ((\text{Kappa Factor}) \times (\text{Kappa Number of Incoming Tobacco Pulp}))/2.63 \quad \text{(Equation 3)}:$$

The "Caustic Factor" is used to scale the amount of alkali applied in an extraction (E) stage, relative to the amount of chlorine dioxide applied in the D stage immediately preceding. The formula is:

$$\% \text{ NaOH on dry tobacco pulp in } E \text{ Stage} = (\text{Kappa Factor}) \times (\text{Kappa number into } D \text{ stage}) \times (\text{Caustic Factor}) \quad \text{(Equation 4)}:$$

In a first example embodiment, a relatively mild chemical pulping operation 100 can be combined with a filtering operation 124, whereby a relatively large amount of rejects can be removed, and a bleaching operation 106 (e.g., a relatively moderate bleaching operation). In particular, a tobacco input can be dried at operation 112, depithed at operation 114, and milled at operation 116 (e.g. until the tobacco input is able to travel through a 0.4 mm (0.157 inches) screen). Chemical pulping at operation 100 can be conducted by combining the tobacco input with a strong base having a weight of about 24% of the tobacco input and a liquid-to-fiber ratio of about six to one at operation 102. Further, chemical pulping at operation 100 can include heating the tobacco input and the strong base at operation 104 to a maximum temperature of about 160° C., with about a 60 minute ramp time to maximum temperature, and an H-factor of about 800. After chemical pulping at operation 100, water can be mixed with the tobacco pulp to form a slurry at operation 122. The slurry can be mixed for about 20 minutes to complete defibration. The slurry can then be filtered at operation 124 (e.g., using a vibrating flat screen equipped with about 0.010 inch slots). The material accepted through the screen can be washed, dewatered, and centrifuged at operation 130.

The filtering operation 124 can remove various portions of the tobacco pulp and exclude it from further processing. For example, in one embodiment a weight of the portion of the tobacco pulp that is removed can be greater than about 25% of a weight of the tobacco pulp prior to filtering. In this embodiment, a weight of the strong base employed in chemical pulping the tobacco input can be less than about 30% of the weight of the tobacco input and the H-factor can be less than about 1,000.

In a variation of this embodiment, the tobacco input can be subjected to an auto-prehydrolysis operation prior to chemical pulping the tobacco input at operation 100. For example, auto-prehydrolysis can comprise soaking the tobacco input in water (e.g., for 72 hours), draining the water, and then heating the tobacco input (e.g. at 120° C. for 30 minutes). In this regard, hemicelluloses materials can generate acetic acid during such a treatment, via cleavage of acetyl groups, and thereby the acidic treatment can cause removal of hemicelluloses. After prehydrolysis, the material can be allowed to soak (e.g., for 24 hours) to remove the residual acid prior to soda cooking.

Bleaching of the tobacco pulp at operation 106 after chemical pulping at operation 100, can involve a D-E-D-D sequence. In other words, bleaching the pulp at operation 106 can involve chlorinating the tobacco pulp at operation 108 (e.g., conducted at about 70° C. for about 1 hour with about a 0.5 Kappa factor, about 10% weight ratio sulfuric acid on the tobacco pulp, and about 6% consistency), caustically extracting the tobacco pulp at operation 110 (e.g., conducted at about 70° C. for about 1 hour with about a 0.1 caustic factor, and about 6% consistency), and chlorinating the tobacco twice more at operations 136 and 138 (e.g., conducted at about 70° C. for about 1.5 hours and about 1 hour, respectively, with about 4.0% weight ratio chlorine dioxide and about 10.0% weight ratio sulfuric acid on the tobacco pulp).

In this regard, chemical pulping the tobacco input at operation 100 with relatively mild chemical and temperature conditions, rejecting a relatively large portion of the tobacco during the filtering operation 124, and bleaching the tobacco pulp accepted through the filter at operation 106 can result in a product suitable for use in the production of microcrystalline cellulose. However, the weight of the strong base, the H-factor, the portion of the tobacco input that is removed, and various other factors can vary from the above-described conditions in some embodiments.

In a second example embodiment, fractionation can be employed to increase the alpha cellulose content and offset a relatively moderate chemical pulping operation 100 and/or a relatively moderate bleaching operation 106. In this regard, chemical pulping at operation 100 can be conducted, for example by heating the tobacco input and NaOH over the course of 60 minutes to a maximum temperature of about 167° C., with an H factor of about 1,000, about 36% NaOH on the dry tobacco input, and a liquid-to-fiber ratio of 3 to 1. Further, bleaching at operation 106 can be conducted in a D-E-D sequence. For example, bleaching at operation 106 can include chlorinating the tobacco pulp at operation 108 (e.g., at about 70° C. for about 1 hour with about a 0.5 Kappa Factor (about 5.7% weight ratio $ClO_2$ on dry tobacco pulp), 10% weight ratio $H_2SO_4$, at about 1.5% consistency), caustically extracting the tobacco pulp at operation 110 (e.g., at about 70° C. for about 1 hour with about a 0.1 Caustic Factor (about 1.5% weight ratio NaOH on dry tobacco pulp) and about 1.5% consistency), and chlorinating the tobacco pulp at operation 136 (e.g., at about 70° C. for about 1.5 hours with about a 4.0% weight ratio $ClO_2$ and 10% $H_2SO_4$ on dry tobacco pulp).

However, as noted above, additional operations can be combined with the above-described operations to increase the alpha cellulose content of the product produced thereby. For example, this embodiment can also include mixing water with the tobacco pulp to form a slurry at operation 122 and filtering the slurry with a filter such that a portion of the tobacco pulp is removed at operation 124. In some embodiments filtering the slurry at operation 124 can comprise receiving a first portion of the tobacco pulp through the filter at operation 126 and receiving a second portion of the tobacco pulp through the filter 128 after receiving the first portion.

In one embodiment, at least the second portion of the tobacco pulp can be subjected to the bleaching. In this regard, the second portion of the tobacco pulp, which is received through the filter after the first portion of the tobacco pulp, can define a relatively higher concentration of alpha cellulose than the first portion of the tobacco pulp received through the filter. For example, it can be possible that damaged, broken-down, beta cellulose is initially received through the filter more easily than undamaged alpha cellulose. Accordingly, the second portion of the tobacco pulp received through the filter can be higher in alpha cellulose, and hence more suitable for the production of microcrystalline cellulose. Thus, the second portion of the tobacco pulp received through the filter can be bleached at operation 106 and subjected to the other operations configured to form microcrystalline cellulose. However, in some embodiments at least some of the first portion of the tobacco pulp can be additionally employed in the continuing operations configured to produce microcrystalline cellulose.

In a third embodiment, a relatively harsh chemical pulping operation 100 can be employed. In this regard, the strong base employed in chemical pulping the tobacco input at operation 100 can be greater than about a 40% weight ratio of the tobacco input and the H-factor can be greater than about 900. Thus, chemical pulping the tobacco input at operation 100 with relatively harsh chemical and temperature conditions and bleaching the tobacco pulp at operation 106 (e.g., a moderate bleach operation) can result in a product suitable for the production of microcrystalline cellulose. Accordingly, various methods can be employed to produce tobacco pulp suitable for the production of microcrystalline cellulose.

In one embodiment the dissolving grade pulp (e.g., after the bleaching operation 106) employed to produce microcrystalline cellulose can define greater than about 85%, greater than about 88%, or greater than about 90% alpha cellulose. Further, the dissolving grade pulp can define a brightness under International Organization for Standardization (ISO) conditions that is greater than about 80%, greater than about 83%, greater than about 85%, or between about 80% and 90%. The tobacco pulp (e.g., after the chemical pulping operation 100) can define a kappa number less than about 30, less than about 25, less than about 23, or between about 20 and about 30 in some embodiments. Additionally, the degree of polymerization (DP) of the dissolving grade pulp can be less than about 750, less than about 500, or from about 100 to about 750, and not more than about 5%, not more than about 10%, not more than about 15%, or between about 5% and about 15% of the material can have a particle size of less than about 3 μm, less than about 5 μm, or less than about 10 μm.

In this regard, the health of cellulose chains in pulp is often assessed using a 0.5% cupriethylenediamine (CED) viscosity test. In this test, the pulp is dissolved in a common cuprammonium-based agent, at a concentration of 0.5% by weight. The viscosity of the solution is then measured, using a capillary viscometer. The viscosity of the dissolving grade pulp employed to form the microcrystalline cellulose can define a viscosity of less than about 15 centipoise, less than about 10 centipoise, less than about 5 centipoise, at least about 4 centipoise, or between about 2 centipoise and about 15 centipoise.

The degree of polymerization of the dissolving grade pulp can be estimated by diluting the 0.5% solution stepwise, then measuring the viscosity of each solution. A linear relationship can be generated, and the line can be extrapolated back to the equivalent point of 0% concentration of cellulose in solvent. This value can then used to calculate the molecular weight of the cellulose. The value obtained for molecular weight can then divided by the weight of the anhydro-glucan monomer (weight=162) to obtain the cellulose degree of polymerization.

Note that although specific combinations of chemical pulping and bleaching are described above, in other embodiments tobacco may be processed in other manners. In this, regard, the D, E, and Ep stages described above may be employed alone or in other combinations, such as D, D-E, D-D, E-D, Ep-D, etc. By way of specific example, reconstituted tobacco may be subjected to bleaching without chemical pulping, whole-plant biomass may be subjected to bleaching without chemical pulping, reconstituted tobacco may be subjected to bleaching and exposure to ozone, etc.

Further, although chemical pulping is generally described herein with respect to certain example parameters, other parameters and chemicals may be employed in other embodiments. For example, parameters and chemicals traditionally associated with the Kraft (sulphate) process may be employed in some embodiments. Accordingly, it should be understood that the disclosure provided herein is provided for example purposes only.

Note also that the microcrystalline cellulose disclosed herein may be produced in powdered or colloidal forms. In this regard, powdered microcrystalline cellulose may be produced by drying crystalline bundles produced in accordance with the above-described processes to cause the product to take the form of aggregates of very porous particles that are capable of absorbing large amounts of water or oil onto the surface. Colloidal microcrystalline cellulose may be produced by isolating and disintegrating the crystalline regions of cellulose in an aqueous-based process, resulting in an odorless and tasteless product suitable for uses as a binding agent or disintegrant, by way of example.

EXPERIMENTAL

The following examples are provided to illustrate further aspects associated with the present disclosure, but should not be construed as limiting the scope thereof. Unless otherwise noted, all parts and percentages are by dry weight.

Experiments can be conducted wherein alpha cellulose and microcrystalline cellulose can be produced from tobacco. Experiments with respect to the production of alpha cellulose and microcrystalline cellulose from tobacco are summarized below and grouped into Examples 1-11. The tobacco inputs employed in the experiments can include flue-cured tobacco stalks, burley tobacco stalks, reconstituted tobacco, and whole-plant tobacco biomass.

Example 1

Initial tests can be conducted on reconstituted tobacco ("recon") in chopped sheet form, and raw tobacco biomass ("biomass") in shredded form. The biomass can be squeezed in wet, green form, to expel liquids therefrom, followed by air drying, prior to conducting any tests thereon.

For the first trials, the recon material can be evaluated because it can be pre-processed (implying it can have a better chance at uniformity), and biomass can be still somewhat woody in nature (meaning it probably would need a more intense first treatment, such as pressurized chemical delignification). Thus, since recon can have a significant content of materials that can be easy to remove, initial attempts to purify this material can focus on typical bleaching stages used to purify partially-delignified wood pulps (e.g., D, E, and/or Ep stages).

Combinations of these stages ("sequences") can be evaluated, with the final material tested for Kappa number. A D stage can employ 25.8% $ClO_2$, 15% $H_2SO_4$, with 6% consistency at 80° C. for 90 minutes. A D-E combination can employ the above-described D stage and an E stage with 6.8% NaOH, with 6% consistency at 80° C. for 60 minutes. A D-D combination can employ the above-described D stage followed by a second D stage employing 4% $ClO_2$, 8% $H_2SO_4$, with 6% consistency at 80° C. for 90 minutes. An E-D combination can employ an E stage with 10% NaOH, 6% consistency at 80° C. for 90 minutes and a D stage with 23.9% $ClO_2$, 10% $H_2SO_4$, with 6% consistency at 80° C. for 90 minutes. An Ep-D combination can include an Ep stage with 10% NaOH, 10% $H_2O_2$, with 6% consistency at 80° C. for 90 minutes and a D stage with 23.0% $ClO_2$, 10% $H_2SO_4$, 6% consistency at 80° C. for 90 minutes. Chemical dosages for $ClO_2$, $H_2SO_4$, NaOH, and $H_2O_2$ and other chemicals discussed herein can be expressed in terms of % of dry chemical on moisture-free material treated.

The above-described bleaching operations can be able to reduce the Kappa number (e.g., by reducing the Kappa number to the range of 13 to 3.8), but none are believed to be able to fully purify the material to an extent necessary to produce microcrystalline cellulose therefrom. The final pulp is typically light yellow in color, whereas pure cellulose should be white. The recon material can start out as a flaky, paper-like material. However, as D bleaching treatments are applied, it can become more fibrous and pulp-like, indicating that the pith, parenchyma, and tissue-like materials are being removed. The D-D material typically feels much like wood pulp.

One very unusual phenomenon is noted. When the recon is first treated under alkaline conditions (as for the first stage in the E-D or Ep-D sequences) or treated with D and then E, instead of becoming more fibrous, it becomes very mushy and wet. The material appears to be highly swollen. When the alkali-treated material is washed and centrifuged, the final consistency (solids content) is measured at approximately 6%. Normally, lignocellulosic materials will achieve a consistency of 25-35% after centrifugation. Clearly, alkali treatment causes something in the recon to swell and to hold water, even under conditions of centrifugation. To see if the effect is reversible, some of the swollen mush is acidified to a pH of 2.5 and held for one hour, followed by washing. The consistency after centrifugation is 10%, which is better, but still not typical of an unswollen cellulosic weight. It is speculated that the presence of large amounts of pith and parenchyma are responsible for this swelling behavior.

The yield losses after each treatment are significant (20-30%). It is expected that, by the time the recon is properly purified, the final yield of product will be 20-30% based on the dry raw material. The overall results tend to indicate that it would be preferable to remove the easily extracted materials with an alkaline stage (intense E stage, or a traditional alkaline pulping stage), followed by a single stage of D bleaching. This approach would also be the most economical. In this regard, it surprisingly appears that bleaching alone is not sufficient to produce tobacco pulp useable to produce microcrystalline cellulose.

Example 2

The previous example discussed attempts to purify the recon material using simple, multi-stage bleaching treatments common to the pulp and paper industry. While some of the treatments are able to remove much of the material weight, none are able to completely "purify" the recon. In this regard, as noted above, production of microcrystalline cellulose from tobacco presents challenges as compared to the procedures employed to produce microcrystalline cellulose from wood pulp.

In the paper industry, economics dictate that the bulk of the non-cellulosic material in wood should be removed using less expensive chemicals, in a first step termed "chemical pulping." Bleaching stages are then used to remove the residual non-cellulosic materials without damaging the cellulose. Chemical pulping is usually carried out using a strong base such as sodium hydroxide. Since the bleaching stages discussed above are unable to fully purify the recon, simple alkaline pulping stages are employed instead. Pulping stages can be used in an attempt to accomplish the same task, on both recon and biomass materials. An atmospheric caustic boil treatment on recon removes over half of the weight, but this does not lower the amount of oxidizable material (as measured by the Kappa number, which is between 57 and 75). The conditions employed can include use of NaOH in 1%-15% weight ratio, 100° C.-120° C., a liquid-to-fiber ratio between 6 and 49 to 1, a ramp up time of 60 minutes and a dwell time of 30 minutes. Such behavior usually indicates the presence of pith or other extraneous materials, which consume alkali rapidly, cook away readily, but have no effect on Kappa number. Pressurized cooks using moderate caustic charges, on both raw materials, can give similar low yields, with high consumption of caustic but no reduction of Kappa number. Pressurized cooks are carried out in "finger reactor," which is a pressurized reactor with internal tines (fingers) which rotate slowly to keep the weight mixed during cooking. The cooked biomass material is very raw, with little fiberization noted. It is clear from atmospheric and pressurized pulping that in order to purify the recon or the biomass, high caustic charges are needed to remove the extraneous materials and start the delignification process. Application of an intense acid chlorite treatment can purify the recon material, producing a white, slow-draining, crill-like material. Upon drying, this material can exhibit characteristics similar to those noted for micro- and nano-crystalline cellulose.

Example 3

Additional tests show that a D-E-D bleaching sequence, with massive amounts of chemical applied, appears to be able to purify the recon material. The conditions of this D-E-D bleaching sequence can include a D stage with a 1.0 Kappa Factor (25.8% $ClO_2$), 15% $H_2SO_4$, 6% consistency at 80° C. for 90 minutes, an E stage with 6.8% NaOH, with 6% consistency at 80° C. for 60 minutes, and a second D stage with 6% $ClO_2$, 8% $H_2SO_4$, with 6% consistency at 80° C. for 90 minutes. This can result in a Kappa number of 2.1.

Chemical pulping can be conducted in a finger reactor and biomass with NaOH between 25% and 30% at 120° C. with a liquid-to-fiber ratio of 6, a ramp time of 60 minutes, and a dwell time of 30 minutes. The resulting Kappa number can be between 53.5 and 60.5. Thus, additional pressurized pulping trials show that because of the large quantity of extraneous materials in the recon material, pulping or bleaching processes intended to purify the material can consume large amounts of chemical—much more than for the pulping and bleaching of wood. Single-stage purification of the recon with ozone does not yield promising results when applied at 0.9% weight ratio and 1.5 pH at ambient temperature.

Example 4

Biomass is put through a mill in order to reduce the size of larger pieces of the biomass, and thereby attempt to improve the results from chemical treatments. The resulting lightly-milled biomass is subjected to the D-E-D bleaching sequence described in Example 3, and the result is a fairly bright and mostly-delignified material. The resulting Kappa number for the biomass is 4.7, and when the same test is conducted on recon, the resulting Kappa number is 2.1.

Trials are also conducted wherein the biomass can be more intensely milled to an average particle size of about 0.4 mm (0.157 inches). The milled biomass is subjected to trials including a single D stage, a single E stage, and D-E in combination, under the following conditions: a D stage with a 1.0 Kappa Factor (25.8% $ClO_2$), 1.5% $H_2SO_4$, with 6% consistency at 80° C. for 90 minutes, an E stage with 10% NaOH, with 6% consistency at 80° C. for 90 minutes. The single D stage conducted on this milled biomass is able to achieve the same degree of delignification as the D-E-D bleaching sequence reported in Example 3. Kappa numbers for the D, E, and D-E trials on biomass are 1.5, 51.8, and 7.2, respectively. When the same trials are conducted on recon, the resulting Kappa numbers are 2.1, 40.4, and 3.0, respectively. Note that this single stage bleaching involves usage of a massive dose of chlorine dioxide (25.8% weight ratio of oven dried fiber), which is 12 times the charge typically employed for wood pulp bleaching.

Example 5

An attempt is made to separate the coarser, more woody fraction of the biomass from the finer material, in hopes of removing some of the non-cellulosic materials (pith, parenchyma, tissue). A wood classification screen is employed with a 3 mm (0.118 inches) slot setting, with some success. Chemical pulping trials are conducted on the woody portion of the screened biomass in the above-described finger reactor. The trials are conducted using typical chemical charges of NaOH, temperatures, and times employed in soda pulping of wood pulp. For example, the trials use 15% to 22.5% weight ratio NaOH at a temperature between 120° C. and 160° C. with a liquid-to-fiber ratio of 6, a ramp time of 60 minutes, and an H-factor of 800 with dwell time of 30 minutes. The resulting Kappa numbers are between 37.9 and 67.3. The results show that material can be removed from the biomass, as indicated by a reduction in Kappa number and yield. The small reduction in Kappa number, relative to the raw material starting Kappa number, may point to a large consumption of alkali by non-cellulosic components in the biomass. In one trial, the tobacco input is subjected to soaking in water (auto-prehydrolysis) for 2 hours. Although auto-prehydrolysis is known to remove hemicelluloses in wood pulp, this procedure yields no appreciable difference in kappa number immediately after chemical pulping when employed with biomass.

Bleaching is done on the pulped material, using a D-E-D sequence. The first D stage is conducted with a 4.25%-25.8% $ClO_2$, 5%-15% $H_2SO_4$, with 6% consistency at 70° C.-80° C. for 60-90 minutes, the E stage is conducted with 1%-6.8% NaOH, with 6% consistency at 70° C.-80° C. for 90 minutes, and the second D stage is conducted with a 4%-7% $ClO_2$, 10% $H_2SO_4$, with 6% consistency at 70° C.-80° C. for 60-90 minutes. Although auto-prehydrolysis yields no appreciable difference in the tobacco pulp immediately after chemical pulping, it appears that auto-prehydrolysis can have beneficial results with respect to the Kappa number of the dissolving grade pulp after the bleaching operation. For example, the Kappa number after auto-prehydrolysis, chemical pulping and bleaching is 1.2, whereas without auto-prehydrolysis, the Kappa number is between 3.1 and 5.9. Thus, the benefits of auto-prehydrolysis may not be achieved until after the bleaching operation is conducted.

Example 6

Samples of dried burley tobacco stalk are cut by hand into small pieces (e.g., 1-2 inches) and then manually depithed using knives and other scraping devices. For analytical testing, the pieces are milled into a meal, using a mill equipped with a 0.4 mm (0.157 inches) screen. Soda pulping is conducted at a 24% weight ratio on oven dried fiber, six to one liquor-to-fiber ratio, maximum temperature of 160° C., and an H-factor of 800 (60 minute ramp time to maximum temperature). After pulping, water is added, and the slurry is mixed for 20 minutes to complete defibration. The slurry is then screened in a vibrating laboratory flat screen equipped with 0.010 inch slots. The material accepted through the screen is washed, dewatered, and centrifuged. The resulting Kappa number is 20.

Subsequent bleaching of this pulp, using a D-E-D-D sequence, can produce a high-brightness, high-freeness pulp with little residual lignin. The testing conditions can include a first D stage conducted with a 0.5 Kappa Factor, 10% $H_2SO_4$, with 6% consistency at 70° C. for 60 minutes, the E stage can be conducted with a 0.1 Caustic Factor, with 6% consistency at 70° C. for 60 minutes, the second D stage can be conducted with a 4% $ClO_2$, 10% $H_2SO_4$, with 6% consistency at 70° C. for 90 minutes, and the third D stage can be conducted with a 4% $ClO_2$, 10% $H_2SO_4$, with 6% consistency at 70° C. for 60 minutes. The resulting Kappa number is less than 1, and the brightness is greater than 85%.

Example 7

Fully-bleached pulp produced in accordance with Example 6 from dried burley stalks is tested for alpha-beta-gamma cellulose content, as per TAPPI (Technical Association of the Pulp and Paper Industry) Standard Method T203. In the test, the pulp is treated successively with 18% and 9.45% sodium hydroxide solutions at 25° C. The soluble fraction, consisting of beta- and gamma-celluloses, is determined volumetrically by oxidation with potassium dichromate, and the alpha-celluloses, as an insoluble form, and is determined by calculating the difference. In this regard, the alpha cellulose content of the material produced in Example 6 is greater than 89%. MCC is traditionally produced using wood-derived dissolving pulps with alpha-cellulose content in the range of 85-90%.

Example 8

Previous example soda cooks on burley stalks produce a bleachable-grade pulp with a fairly low Kappa number (20-25), but the level of material rejected during screening (30-50% by weight) is relatively high. This example describes cooks with higher doses of alkali. In particular, one embodiment in which 24% weight ratio NaOH with a 6 to 1 liquid-to-fiber ratio, a maximum temperature of 160° C., a ramp up time of 60 minutes, and an H-factor of 800 results in a Kappa number of 23 without auto-prehydrolysis or 22 with auto-prehydrolysis at 120° C. for 30 minutes.

Auto-prehydrolysis involves soaking, draining, and heating in an attempt to remove hemicelluloses prior to soda pulping. This results in a 16% yield loss, so some material is removed. These cooks produce a bleachable pulp with acceptable purity for microcrystalline cellulose manufacture. In this regard, the brightness is greater than 85%, the Kappa number is less than 1, and the product contains 90% or greater alpha cellulose with an average fiber length between 0.725 mm and 0.746 mm.

In prior work, the bleaching results and the alpha-beta-gamma test results are quite positive for cooks done using 24% sodium hydroxide on oven-dried (OD) stalk material. However, the amount of material rejected by the 0.001-inch slotted screens is excessive (e.g., 30-50% of the total weight of material produced by cooking). In order to increase the commercial viability of producing microcrystalline cellulose from tobacco and reduce waste material and related removal operations, new cooks utilize a higher NaOH charge (e.g., up to 36%) in an attempt to drive the screen rejects down while keeping the Kappa number at the same level or lower. The ideal Kappa number range for bleachable-grade pulps from hardwoods and nonwoods is 10-20, with screen rejects less than 5%. The lower Kappa number also reduces the number of bleaching stages needed, as well as the bleaching cost. Although employing higher concentrations of NaOH (e.g., up to 36%) can reduce the screened rejects considerably, the Kappa number rises dramatically into the 40% range, because of the higher level of lignin-containing fibers passing through the screen.

Example 9

The above-described soda cooks produce an unbleached pulp with negligible screen rejects, good bleachability, and a bleached alpha cellulose content of up to 92%. Other trials are conducted in an attempt to drive the Kappa number of the pulp to the 8-10 range and see if even higher alpha-cellulose content can be obtained. In this regard, the alkali charge are increased (e.g. to about 46% weight ratio), while the H-factor (pulping intensity as measure by temperature and time) are held at 1200. The Kappa number decreases by about six percentage units. For other cooks, the alkali charge is held at 43% on OD fiber, while the H-factor is increased to 1800 and 2100, respectively. Oddly, there is no shift in alkali consumption, and, not surprisingly, there is no decrease in Kappa number.

In another cook, the alkali charge is kept at 43% on OD fiber, while the H-factor is increased by a relatively large amount, to 3000. The alkali consumption rises only slightly, and the Kappa number decreases by only about two percentage points. In a last effort to drive the Kappa number down further, the alkali charge is increased by 3%; a relatively large increase for typical pulping trials. The results are again surprising, with the Kappa number only decreasing another two points.

The chemical pulping in the above-described cooks results in Kappa numbers between about 22.3 about 14.5. This pulp is subjected to bleaching in a manner identical to that described for previous trials, with one notable exception—with a lower starting Kappa number, the third D stage is not required in order to meet the brightness target. The conditions used for the D-E-D sequence include a first D stage conducted with a 0.5 Kappa Factor (3% $ClO_2$), 10% $H_2SO_4$, with 6% consistency at 70° C. for 60 minutes, the E stage that includes a 0.1 Caustic Factor, with 6% consistency at 70° C. for 60 minutes, and the second D stage conducted with a 4% $ClO_2$, 10% $H_2SO_4$, with 6% consistency at 70° C. for 90 minutes. The pulp responds well to the sequence, and the final results are: Final Brightness=86.7% ISO and Bleached Yield=94.3%.

The bleached pulp described above is tested for cellulose content. The alpha cellulose content is about 91.9%, with a brightness of about 86.7%. In this regard, the final bleached pulp has a moderately-higher alpha cellulose content and lower beta-cellulose content that pulps tested previously. However, the content of gamma cellulose (which is taken as being short, fluffy chains of hemi-cellulose type material) increases significantly. It is possible that the increased cooking intensity causes re-deposition of hemicelluloses in the unbleached pulps, a phenomenon noted for some types of cooking. It is not known if this increase in gamma-cellulose would negatively affect MCC production.

Thus, two non-limiting approaches to producing a pulp suitable for microcrystalline cellulose manufacture can include:
  Low alkali charge and moderate pulping intensity.
    Advantages: lower pulping cost; possibility of yield increase if screen rejects are re-cooked; higher overall bleached pulp yield.
    Disadvantages: higher bleaching cost; slightly lower alpha-cellulose content in final pulp; logistics in dealing with very large quantity of screen rejects.

High alkali charge and high pulping intensity.
  Advantages: lower bleaching cost; lower screened rejects to deal with; moderately higher alpha cellulose content.
  Disadvantages: higher pulping cost, including very high chemical cost; lower production rate due to longer cooking time; lower yield of bleached pulp; higher gamma-cellulose content.

Example 10

Employing a chemical pulping operation on a burley stalk tobacco input can produce a tobacco pulp with similar characteristics to a tobacco pulp produced from flue-cured stalk under the same conditions. Accordingly, the remaining examples relate to burley stalk. In one example embodiment, a chemical pulping operation similar to that discussed above is conducted, except anthraquinone (AQ) (e.g., 0.1%-0.3% weight ratio anthraquinone) is employed in the chemical pulping. The resulting Kappa number is slightly lower than the Kappa number resulting from the same chemical pulping without use of AQ. Normally the use of AQ permits increased delignification (as evidenced by lower Kappa numbers) and higher yield (due to more protection of carbohydrates). When the tobacco pulp subjected to chemical pulping including AQ is subjected to bleaching, the net result is similar to that produced without AQ, except the alpha cellulose content is slightly lower.

A preliminary attempt is made to generate MCC from the bleached pulp subjected to a mild chemical pulping with high screen rejects, which has a relatively high alpha cellulose content. Ten grams of the air-dried pulp is placed in a boiling flask, 150 grams of 2N HCL is added, and the mixture is allowed to boil with reflux for 45 minutes. The conversion of the fibrous weight into a finely divided solid is apparent during the boil, and the mixture turns slightly yellow. After cooling, the mixture is filtered and washed with copious amounts of distilled water. The filtrate is pale yellow. The residue is off-white. The residue is oven-dried (not typical for MCC), then placed into a ball mill with ceramic marbles for one hour. The resulting powder-like material and other soda pulped materials are tested for degree of polymerization and viscosity. The viscosity is about 2.31 centipoise. With respect to degree of polymerization, the microcrystalline cellulose produced in the above-described procedure has a degree of polymerization of about 142, which falls within the range of existing microcrystalline cellulose products (e.g., about 100-300), such as FMC AVICELL® PH.

Example 11

Pilot-scale pulping can be accomplished in a rotary globe digester with a diameter of six feet and a total volume of 113 cubic feet. The digester is lined with 316 stainless steel. Heating is provided by direct steaming through one axial joint. The rotational speed during cooking is approximately 6 rotations per minute. For each trial, the screened burley stalk is loaded into the digester. The sodium hydroxide and makeup water is added, and then the digester is sealed and allowed to rotate for one hour with no heating, to ensure good liquor penetration. Steam is then gradually introduced into the vessel while it is rotating. It takes approximately one hour to get to the specified maximum temperature. Temperature is checked via a thermocouple extending into the interior of the vessel. Pressure is also monitored.

At the end of each cook, an axial valve is opened gradually, to permit complete depressurization over the course of about 30 minutes. The digester hatch is then opened, and the contents are carefully dumped into a special catch box with a false bottom and lined with a fine-mesh polyester fabric. The black liquor draining below the false bottom is collected in 50-gallon drums and saved. One sample is tested for pH.

The cooked pulp material is washed, using copious amounts of cold tap water, while allowing the filtrate to drain from the bottom of the false-bottom catch box. A composite sample of the pulp is obtained and tested for Kappa number. If the Kappa proved to be acceptable, the fiber is transferred into a 2500 gallon tank and diluted with cold tap water to approximately 1% consistency for screening. Screening is carried out with a pressure screen typically used in the paper industry. The screen is equipped with a basket with 0.010-inch slots. Feed to the screen is approximately 80 gallons/minute, with an accept flow rate of 50-60 gallons/minute. The accept stream is directed into a separate 2500-gallon tank. To minimize good fiber losses, the reject stream from the screen is directed back into the feed tank. A small stream of dilution water is continuously added to the feed tank, to keep the weight from thickening excessively due to water losses with the rejects. Screening is continued until no more acceptable fiber can be seen in the reject stream. The screen accepts are drained back into the false-bottom catch box, dewatered, and then saved in plastic drums until it is time for the bleaching trials.

Pilot-scale bleaching is carried out in an 800-gallon fiberglass tank (chlorine dioxide bleaching cannot be done in stainless steel tanks, due to corrosion). The brown fiber is loaded into the tank. Because the tank cannot easily be heated after the fiber is added, dilution to 1.5% consistency is done using water that is heated to 10° C. above the target stage temperature. The pulp weight can hold temperature fairly well during the stage.

For each D stage, sodium chlorite is dissolved in warm tap water and then added to the tank. The slurry is then mixed for 15 minutes, to ensure good distribution of the chlorite. The proper amount of sulfuric acid, diluted in cold tap water to a total volume of about 5 gallons, is then slowly poured into the tank. A plastic tarp is used to seal the top of the tank, to avoid excessive gas emission. The pulp is agitated continuously during the reaction time. At the end of the stage, the residual chlorine dioxide is neutralized by dissolving sodium sulfite (e.g., 10% on OD fiber) in hot tap water and then adding this solution to the tank. After 15 minutes, the slurry is then drained into the catch box, washed, and allowed to drain.

A large cook employs about 155 pounds of screened burley stalk which has been chipped using a commercial chipper. The alkali charge is increased from 24% (which, as discussed above, is employed successfully on a small scale) to 26% weight ratio, and the liquor-to-fiber ratio is reduced from 5:1 to 4:1 to account for dilution. The Kappa number is surprisingly high (e.g., about 63).

Accordingly, a bench-scale cook is conducted in a digester using indirect heating. It is decided to use a 26% alkali charge and use a liquor-to-fiber ratio of 6:1. The result is as follows: Kappa=34, black liquor pH=13.1, total yield=35%, and rejects=less than 0.1%. This result is very similar to the results from a prior cook using 36% NaOH on OD, which is again surprising. As another check, another bench-scale cook is conducted, with an increase of the liquor-to-fiber ratio to 8:1. Based on previous trials employing an 8:1 liquor-to-fiber ratio, it is predicted that the resulting Kappa number would be about 63. However, the tested value is 44. Based on this result, it is determined that something besides alkali dilution is responsible for the high Kappa values obtained.

At this point, it is decided to do a cook in the 30-liter rotating, direct-steamed digester before attempting another globe digester cook. It is also decided that the alkali charges used in the globe cooks may be too low to produce a bleachable-grade pulp, so the target alkali charge used for this cook is 36%. A starting liquor-to-fiber ratio of 3:1 is used, to avoid excessive dilution during direct steaming. The cook results are as follows: Kappa number=34.2, screened yield=33%, rejects=<0.1%, and Black Liquor pH=12.5.

For subsequent cooks, a small commercial disk chipper is employed to chip the stalks. The material produced from either chipper is screened using an orbital vibrating screen. The results are as follows: Kappa number=32 and black liquor pH=13.0. This is considered a successful result. It is decided to replicate the cook and then combine the brownstocks prior to screening and bleaching. The results for the cook are: Kappa number=26.5 and black Liquor pH=12.7. Given the raw material variability, this is considered a successful replicate.

The brownstocks from the two cooks are combined. The measured total yield is about 35%, which is the same as measured for the bench-scale cook. It is decided to go straight through a pressure screen and hope that the shearing action of the screen rotor would help fiberize the weight. Screening is done up to the point that the screen accepts tank is full.

The D-E-D bleaching conditions used at pilot scale is the same as those used for the successful bench-scale bag bleaches, except that the consistency is much lower to permit agitation in a tank. The bleaching conditions for the D-E-D sequence can include a first D stage conducted with a 0.5 Kappa Factor (5.7% $ClO_2$), 10% $H_2SO_4$, with 1.5% consistency at 70° C. for 60 minutes, the E stage can be conducted with a 0.1 Caustic Factor (1.5% NaOH), with 1.5% consistency at 70° C. for 60 minutes, and the second D stage can be conducted with a 4% $ClO_2$, 10% $H_2SO_4$, with 1.5% consistency at 70° C. for 90 minutes. After bleaching, the pulp is dried in a hot-air tunnel dryer at 400° F.

A remaining slurry from the two previous cooks, which had remained in water for over one week, is drained into the catch box and dewatered. The fiber is manually screened, using the laboratory vibrating flat screen equipped with 0.010-inch slots. The total amount of good fiber is estimated at 20 OD pounds, so the actual screened yield calculated for both cooks is about 33%. These "secondary accepts" are bleached at a pilot scale, using the same procedure and conditions describe above. The resulting pulp has the same brightness as for the primary accepts (83.4%). This pulp is placed into muslin bags and tumble-dried in a large, commercial clothes dryer. The dried pulp is not discolored and can be characterized as a soft, fluffy mass.

For the "primary accepts" from the two above-described cooks—that is, the pulp that ended up in the accepts tank during pilot screening, the alpha cellulose content for this pulp is tested at 81.9%, which is a full 10 percentage points lower than had been obtained for prior pulps produced at bench scale. It is speculated that perhaps the pilot process results in more damaged cellulose than the bench process. The second accepts from the two above described cooks have an alpha cellulose content of 93.3%. This difference in alpha cellulose content for the primary and secondary accepts is striking. The most plausible explanation is that the primary accepts had a significant content of fine materials with a high content of damaged (beta) cellulose. The screening process may tend to have a washing action, with fine materials "flushed" out through the accepts line. In effect, the material left in the screen feed tank (the secondary accepts) is enriched in high-alpha fibers. Thus, fiber fractionation is used on the pulp to significantly enhance alpha cellulose content. Estimated DP values for the two cooks are similar to those obtained previously for bench-scale pulps (e.g., 569 for the primary accepts, and 550 for the secondary accepts).

Overall, there are multiple pathways to get to a product that is high in alpha cellulose and which is suitable for microcrystalline cellulose production including, but not limited to:

1. Conduct a relatively mild cook, with high filter rejects, and bleach the accepts through the filter;
2. Conduct a moderately-harsh cook and do some type of fractionation to remove the fine fraction of the pulp; and
3. Conduct a relatively very harsh cook.

Many modifications and other embodiments of the disclosure will come to mind to one skilled in the art to which this disclosure pertains having the benefit of the teachings presented in the foregoing description; and it will be apparent to those skilled in the art that variations and modifications of the present disclosure can be made without departing from the scope or spirit of the disclosure. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for processing tobacco, the method comprising:
   i) chemical pulping a tobacco input to form a tobacco pulp, wherein chemical pulping the tobacco input comprises:
      combining the tobacco input with a strong base having a weight from about 5% to about 50% of the weight of the tobacco input, and
      heating the tobacco input and the strong base with an H-factor from about 500 to about 3,300; and
   ii) bleaching the tobacco pulp to produce a dissolving grade pulp.

2. The method of claim 1, wherein the tobacco input comprises tobacco stalk.

3. The method of claim 1, wherein the tobacco input comprises reconstituted tobacco.

4. The method of claim 1, further comprising drying the tobacco input prior to chemical pulping the tobacco input.

5. The method of claim 1, further comprising depithing the tobacco input prior to chemical pulping the tobacco input.

6. The method of claim 1, further comprising milling the tobacco input prior to chemical pulping the tobacco input.

7. The method of claim 1, further comprising mixing water with the tobacco pulp to form a slurry;
   filtering the slurry with a filter such that a portion of the tobacco pulp is removed.

8. The method of claim 7, wherein the filter defines a plurality of apertures having a maximum dimension up to 0.01 inches.

9. The method of claim 7, wherein filtering the slurry comprises receiving a first portion of the tobacco pulp through the filter and receiving a second portion of the tobacco pulp through the filter after receiving the first portion, wherein at least the second portion of the tobacco pulp is subjected to the bleaching.

10. The method of claim 9, wherein the strong base employed in chemical pulping the tobacco input defines a weight from about 30% to about 40% of the tobacco input.

11. The method of claim 9, wherein the H-factor is from about 900 to about 1,100.

12. The method of claim 7, further comprising removing at least a portion of the water from the tobacco pulp received through the filter prior to the bleaching.

13. The method of claim 7, wherein the portion of the tobacco pulp that is removed defines a weight that is greater than about 25% of the tobacco pulp prior to filtering.

14. The method of claim 7, wherein the strong base employed in chemical pulping the tobacco input defines a weight that is less than about 30% of the tobacco input.

15. The method of claim 14, wherein the H-factor is less than about 900.

16. The method of claim 1, wherein the strong base employed in chemical pulping the tobacco input defines a weight that is greater than about 40% of the tobacco input.

17. The method of claim 16, wherein the H-factor is greater than about 900.

18. The method of claim 1, wherein bleaching the tobacco pulp comprises:
    chlorination of the tobacco pulp with a chlorine dioxide solution, and
    caustic extraction of the tobacco pulp with a second strong base.

19. The method of claim 18, wherein chlorination of the tobacco pulp with a chlorine dioxide solution comprises in situ acidification of sodium chlorite.

20. The method of claim 18, further comprising neutralizing a remaining portion of the chlorine dioxide solution with sodium sulfite.

21. The method of claim 18, further comprising agitating the tobacco pulp during the chlorination of the tobacco pulp with the chlorine dioxide solution.

22. The method of claim 18, wherein bleaching the tobacco pulp to produce the dissolving grade pulp is conducted in an ordered sequence comprising:
    chlorination of the tobacco pulp with the chlorine dioxide solution,
    caustic extraction of the tobacco pulp with the second strong base, and
    chlorination of the tobacco pulp with a second chlorine dioxide solution.

23. The method of claim 18, wherein bleaching the tobacco pulp to produce the dissolving grade pulp is conducted in an ordered sequence comprising:
    chlorination of the tobacco pulp with the chlorine dioxide solution,
    caustic extraction of the tobacco pulp with the second strong base,
    chlorination of the tobacco pulp with a second chlorine dioxide solution, and
    chlorination of the tobacco pulp with a third chlorine dioxide solution.

24. The method of claim 18, wherein the chlorine dioxide solution comprises sulfuric acid.

25. The method of claim 1, further comprising boiling the dissolving grade pulp in the presence of hydrochloric acid to produce a boiled dissolving grade pulp.

26. The method of claim 25, further comprising filtering a microcrystalline cellulose residue from the boiled dissolving grade pulp.

27. The method of claim 26, further comprising drying and milling the microcrystalline residue to produce a microcrystalline powder.

28. The method of claim 1, wherein the tobacco input and the strong base are heated to a maximum temperature from about 150° C. to about 180° C.

29. The method of claim 1, wherein chemical pulping the tobacco input is conducted in a pressurized vessel.

30. The method of claim 29, further comprising agitating the tobacco input in the vessel.

* * * * *